(12) United States Patent
Kwak

(10) Patent No.: US 11,849,531 B2
(45) Date of Patent: Dec. 19, 2023

(54) UNDERWATER PLASMA GENERATING APPARATUS

(71) Applicant: K FUSION TECHNOLOGY INC., Ansan-si (KR)

(72) Inventor: Hon Kil Kwak, Seoul (KR)

(73) Assignee: K FUSION TECHNOLOGY INC., Seoul (KR)

( * ) Notice: Subject to any disclaimer, the term of this patent is extended or adjusted under 35 U.S.C. 154(b) by 551 days.

(21) Appl. No.: 17/054,158

(22) PCT Filed: May 16, 2018

(86) PCT No.: PCT/KR2018/005632
§ 371 (c)(1),
(2) Date: Nov. 9, 2020

(87) PCT Pub. No.: WO2019/221313
PCT Pub. Date: Nov. 21, 2019

(65) Prior Publication Data
US 2021/0315088 A1    Oct. 7, 2021

(51) Int. Cl.
*H05H 1/00* (2006.01)
*H05H 1/24* (2006.01)

(52) U.S. Cl.
CPC ............... *H05H 1/01* (2021.05); *H05H 1/247* (2021.05)

(58) Field of Classification Search
CPC . H05H 1/01; H05H 1/247; H05H 1/24; C02F 1/30; C02F 1/34; C02F 1/4608
See application file for complete search history.

(56) References Cited

U.S. PATENT DOCUMENTS

2007/0269322 A1    11/2007   Falk et al.
2020/0010340 A1*    1/2020   Miyake ............... C02F 1/46114

FOREIGN PATENT DOCUMENTS

| CN | 1501843 A | 6/2004 |
| CN | 206444423 U | 8/2017 |
| JP | 2007-117853 A | 5/2007 |
| JP | 2008-066241 A | 3/2008 |
| JP | 2009-119347 A | 6/2009 |
| JP | 2009-176991 A | 8/2009 |
| KR | 10-2005-0089000 A | 9/2005 |
| KR | 10-2007-0047966 A | 5/2007 |
| KR | 10-2007-0115855 A | 12/2007 |
| KR | 10-2010-0011246 A | 2/2010 |

(Continued)

OTHER PUBLICATIONS

Chinese Notice of Allowance dated Jul. 26, 2023 issued on Application No. 201880093484.5.

*Primary Examiner* — Wei (Victor) Y Chan
(74) *Attorney, Agent, or Firm* — INVENSTONE PATENT, LLC

(57) ABSTRACT

A underwater plasma generating apparatus according to an embodiment of the present invention includes: a reactor inside of which a flow path, through which a working fluid passes, is formed along a length direction; and a dielectric insertion which is disposed on the flow path, partitions the flow path into a plurality of spaces, has therein one or more through holes for connecting the plurality of spaces and having a smaller cross-sectional width compared to the flow path, and has on one side, a metal catalyst coming into contact with the working fluid which has flowed in through the through holes.

16 Claims, 13 Drawing Sheets

(56) References Cited

FOREIGN PATENT DOCUMENTS

| KR | 10-2016-0134252 A | 11/2016 |
|---|---|---|
| KR | 10-1778438 B1 | 9/2017 |
| WO | 2004-041715 A1 | 5/2004 |
| WO | 2006-068415 A2 | 6/2006 |

* cited by examiner (a)

(b)

(a)

(b)

(a)

(b)

UNDERWATER PLASMA GENERATING APPARATUS

CROSS-REFERENCE TO RELATED APPLICATIONS

This application is a national stage of International Application No. PCT/KR2018/005632, which was filed May 16, 2018.

TECHNICAL FIELD

The present invention relates to an underwater plasma generating apparatus, and more particularly, to an underwater plasma generating apparatus which generates a large amount of micro-nano bubbles in a fluid (liquid) moving in one direction and continuously generates plasma using the micro-nano bubbles.

BACKGROUND ART

Plasma refers to a gaseous state which is separated into electrons (e−) with negative charges and ions (A+: hydrogen atom nuclei) with positive charges at an ultra-high temperature. Further, the plasma also refers to a gas in which particles with electricity are gathered. The plasma has a very high charge separation degree, but is electrically neutral because the number of negative charges and the number of positive charges are totally the same. When a high energy is applied to a gas in a molecular state, the gas is separated into electrons and atomic nuclei at tens of thousands of ° C. to become a plasma state.

In other words, when an energy is applied to a solid, the solid becomes liquid and gas and then when a high energy is applied to the gaseous state again, the gas becomes an ionized state in which the outermost electron (e−) orbiting around the atomic nucleus deviates from the orbit (ionization energy) at tens of thousands of ° C. At this time, the gas becomes a substance in the other dimension in which a gas property of the molecular state is lost. The plasma is also referred to as a fourth substance. In the ionized state, an atom A has a following structural formula.

Atom $A \Leftrightarrow A{+}{+}e{-}$     [Structural Formula]

The plasma is electrically neutral in a state in which the outermost electron orbiting around the atomic nucleus is dissociated so that positive ions and negative ions coexist. The plasmas are good electrical conductors.

Further, in the ionized state of the substance, energy is released by returning to its original stable state over the time. Typical plasma observed in the natural phenomenon is lightning and the aurora in the Arctic region and ion layers in the atmosphere are in the plasma state.

The plasma is a state in which the atomic nucleus and electrons are separated, and is generated by applying a lot of heat to gaseous atom so that all atoms in the hot sun which is 15 million° C. or higher are in the plasma state.

The plasma may be the most common state in the universe. However, in order to use the plasma in everyday life, the plasma needs to be artificially produced. Efforts to artificially generate and commercialize plasma have been steadily promoted for a long time.

The plasma may be generated by applying heat or by applying a high electric field or a magnetic field to induce collision of electrons. Commonly, the plasma is generated using electrical methods such as direct current, an ultra-high frequency, and an electron beam and then needs to be maintained using the magnetic field, and the like.

However, it is hard to progress a technique of generating plasma with a high density through gas, which has been used in the related art to use the plasma as an energy, because a material which has an input energy higher than an output energy or withstands an ultra-high temperature state which can confine the plasma using the ultra-high temperature has not been developed.

Further, even though the plasma is an energy source which is directly used for industrial purpose, according to the plasma generating method of the related art, a contradiction that the plasma is generated using a lot of electricity and the electricity acquired thereby is used as an energy source is repeated so that there is a serious problem in that the efficiency of the energy usage is degraded.

RELATED PRIOR PATENT DOCUMENT (Patent Document 1) Korean Unexamined Patent Application Publication No. 10-2010-0011246

DISCLOSURE

Technical Problem

The present invention is contrived to solve the above-described problem and an object of the present invention is to provide an underwater plasma generating apparatus which generates a large amount of micro-nano bubbles, which is formed with a size of 5 μm or less and has a surface potential with negative charges, in a fluid moving in one direction through a cavitation phenomenon and applies the same type of charges to micro-nano bubbles moving together with the fluid through a metal catalyst to continuously collapse the micro-nano bubbles by a repulsive force, thereby generating a plasma with a high density.

Objects of the present invention are not limited to the above-mentioned objects, and other objects, which are not mentioned above, can be clearly understood by those skilled in the art from the following descriptions.

Technical Solution

In order to solve the above-described problems, an underwater plasma generating apparatus according to an embodiment of the present invention includes a reactor inside of which a flow path, through which a working fluid passes, is formed along a length direction; and a dielectric insertion which is disposed on the flow path to partition the flow path into a plurality of spaces, has therein one or more through holes for connecting the plurality of spaces and having a smaller cross-sectional width compared to the flow path, and has on one side, a metal catalyst coming into contact with the working fluid which has flowed in through the through holes.

In the working fluid flowing in one space of the reactor, micro-nano bubbles which have a surface potential of a negative charge and have a predetermined size or less are generated by cavitation, the micro-nano bubbles which flow into the through hole together with the working fluid to pass through the metal catalyst collapse by the same kind of charges emitted from the metal catalyst to generate plasma, and the working fluid which moves to the other space of the reactor through the dielectric insertion is exposed to the plasma to be ionized.

The underwater plasma generating apparatus may further include an ion separation unit which is installed on an outer surface of the reactor corresponding to the other space of the reactor and applies a magnetic field to the flow of the working fluid ionized by the plasma to separate ions included in the working fluid in accordance with electrical polarities.

The working fluid is hard water ($H_2O$) having a specific resistance of $10^4$ ω·cm or higher or a mixture of the hard water and heavy water ($D_2O$) and the ion separation unit may separate $H^+$ ions and $OH^-$ ions from the working fluid.

The ion separation unit may include a first magnetic substance which is installed on one outer surface of the reactor along a direction perpendicular to an axial direction of the reactor and has an S polarity; and a second magnetic substance which is installed on the other outer surface of the reactor to be opposite to the first magnetic substance and has an N polarity.

The ion separation unit may further include a magnetic substance fixing unit which accommodates the first magnetic substance and the second magnetic substance to be fixed and is coupled to an outer surface of the reactor as a module.

The magnetic substance fixing unit may include: a housing which has therein an accommodation space for accommodating the reactor, the first magnetic substance, and the second magnetic substance; a diaphragm which is coupled to the inside of the housing to partition the accommodating space into a plurality of spaces and supports the first magnetic substance and the second magnetic substance to restrict the movement of the first magnetic substance and the second magnetic substance to a direction perpendicular to the axial direction of the reactor; and a bracket which is fastened with one end portion of the housing along an axial direction of the housing to restrict the movement of the first magnetic substance and the second magnetic substance to the axial direction of the reactor and has therein a reactor through hole through which the reactor passes.

The flow path includes: a first flow path in which the working fluid introduced from the outside is accommodated; a second flow path in which the working fluid passing through the dielectric insertion is accommodated; and a third flow path which connects the first flow path and the second flow path and has a smaller inner diameter than those of the first flow path and the second flow path, a locking protrusion to which the dielectric insertion is caught to be supported along the moving direction of the working fluid is formed between the first flow path and the third flow path, and a guide surface may be formed between the second flow path and the third flow path to guide the movement of the working fluid which is ejected from the dielectric insertion to flow back to the third flow path.

The guide surface may be formed with a structure of a curved surface or an inclined surface.

At the outside of the reactor, a seating support groove which is dented with a predetermined depth from the end portion of the reactor along the length direction of the reactor so that the ion separation unit is seated and restricts the movement of the ion separation unit to dispose the ion separation unit in a position corresponding to the second flow path may be formed.

A length of the second flow path may be longer than a length obtained by connecting a length of the first flow path and a length of the third flow path.

A ratio of a diameter of the first flow path and a diameter of the through hole is at least one of 10:0.5 and 10:4.

The dielectric insertion may include: a dielectric substance which is formed of a dielectric material having a predetermined permittivity and is accommodated over the first flow path, the second flow path, and the third flow path, and a metal insertion which is accommodated in the first flow path and is disposed in front of the dielectric substance to be in contact with the dielectric substance through one surface.

The dielectric substance may include: a first part which is formed to have a size corresponding to the first flow path to be accommodated in the first flow path and has one surface supported by being caught by the locking protrusion; a second part which extends from the first part along an axial direction with a predetermined length to be accommodated in the third flow path and is formed to have a size corresponding to the third flow path; and a third part which extends from the second part along an axial direction with a predetermined length to be accommodated in the second flow path and has a diameter which is gradually reduced toward the moving direction of the working fluid.

The underwater plasma generating apparatus may further include a metal probe which is opposite to a direction perpendicular to a direction where the first magnetic substance and the second magnetic substance are disposed to be opposite and passes through the reactor so that a part thereof is accommodated in the other space of the flow path.

In the other space of the flow path, a distance between an end portion of the dielectric insertion and the probe may be longer than a distance between the probe and an end portion of the reactor.

Advantageous Effects

According to the embodiment of the present invention, the reactor in which a flow path through which the working fluid can move is formed and a metal catalyst which is accommodated in the flow path to cause the cavitation in one space of the flow path and generates a frictional electricity when the fluid flows are provided. Therefore, a large amount of micro-nano bubbles which is formed with a size of 5 μm or less and has a surface potential with a negative charge is generated in a fluid which flows in the reactor and moves in one direction and the same type of charge is applied to the micro-nano bubbles which move together with the fluid to continuously collapse the micro-nano bubbles by the repulsive force, thereby continuously generating a plasma with a high density.

Further, unlike a gas plasma generating apparatus of the related art, without using a high voltage of several thousands to tens of thousands of volts, the plasma may be generated only by the circulation of hydrocarbon oil, hard water ($H_2O$), or the working fluid in which hard water and heavy water ($D_2O$) are mixed. By doing this, a plasma with a higher density than that of the gas plasma may be generated and the structure of the apparatus is simplified to reduce the cost.

Further, the plasma may be continuously generated while circulating the working fluid in one direction and the plasma is generated while being captured in a liquid fluid so that the generation of the plasma by sonoluminescence or chemoluminescence is excluded, to simplify the process and minimize the loss rate of the plasma.

Further, the plasma with a high density is generated in the working fluid which circulates at a rapid speed to ionize the working fluid and a magnetic field is formed in a path where the ionized working fluid moves to efficiently separate ions included in the working fluid in accordance with the electrical polarity.

Further, when hard water ($H_2O$) or the mixture of hard water and heavy water ($D_2O$) is applied as a working fluid, $H^+$ ions and $OH^-$ ions are separated from the ionized working fluid without causing oscillation relaxation and further the separated $H^+$ ions are collected to produce a large amount of hydrogen with a high purity. Further, a plurality of probes which is detachable from the reactor to be partially exposed to an inner space where the plasma is generated is provided so that when the capacitor is connected to the probe, a high voltage electric energy may be acquired.

MODES OF THE INVENTION

Figure 1:
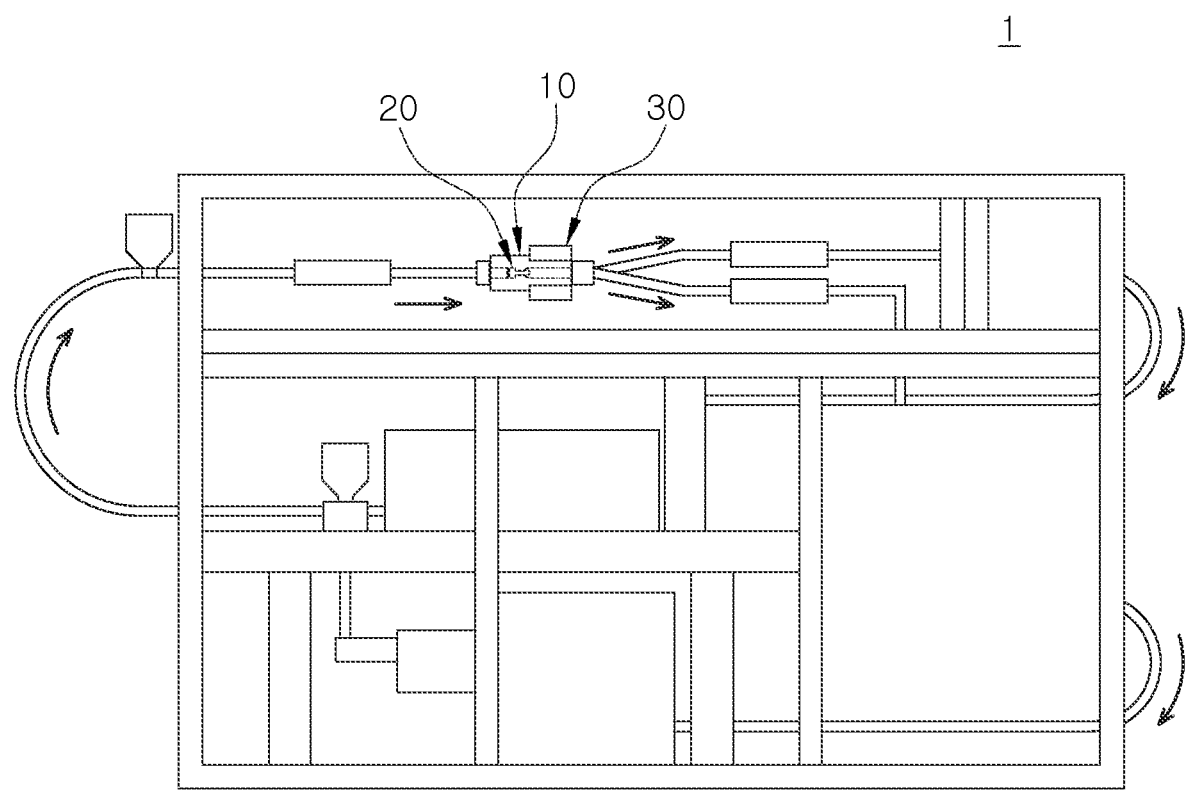
FIG. 1 is a diagram schematically illustrating an underwater plasma generating apparatus according to an embodiment of the present invention.

Hereinafter, various embodiments will be described in more detail with reference to accompanying drawings. The embodiment disclosed in the present specification may be modified in various forms. A specific embodiment is illustrated in the drawings and is described in detail in the detailed description. However, the specific embodiment disclosed in the accompanying drawing is merely provided for easy understanding of various embodiments. Accordingly, it should be understood that the technical spirit is not limited by the specific embodiment disclosed in the accompanying drawing, but includes all equivalents or alternatives included in the spirit of and the technical scope of the present invention.

Terms including an ordinary number, such as first and second, are used for describing various constituent elements, but the constituent elements are not limited by the terms. The above terms are used only to discriminate one component from the other component.

In the present specification, it should be understood that terminology "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance. It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

In the meantime, "module" or "unit" for components used in the present specification performs at least one function or operation. Further, "module" or "unit" may perform a function or an operation by software or a combination of hardware and software. Further, a plurality of "modules" or a plurality of "units" excluding "module" or "unit" which has to be executed in a specific hardware or is executed in at least one processor may be integrated as at least one module. A singular form may include a plural form if there is no clearly opposite meaning in the context.

In addition, in the description of the exemplary embodiment, a detailed description of known configurations or functions incorporated herein will be contracted or omitted when it is determined that the detailed description may make the subject matter of the present disclosure unclear.

Figure 2:
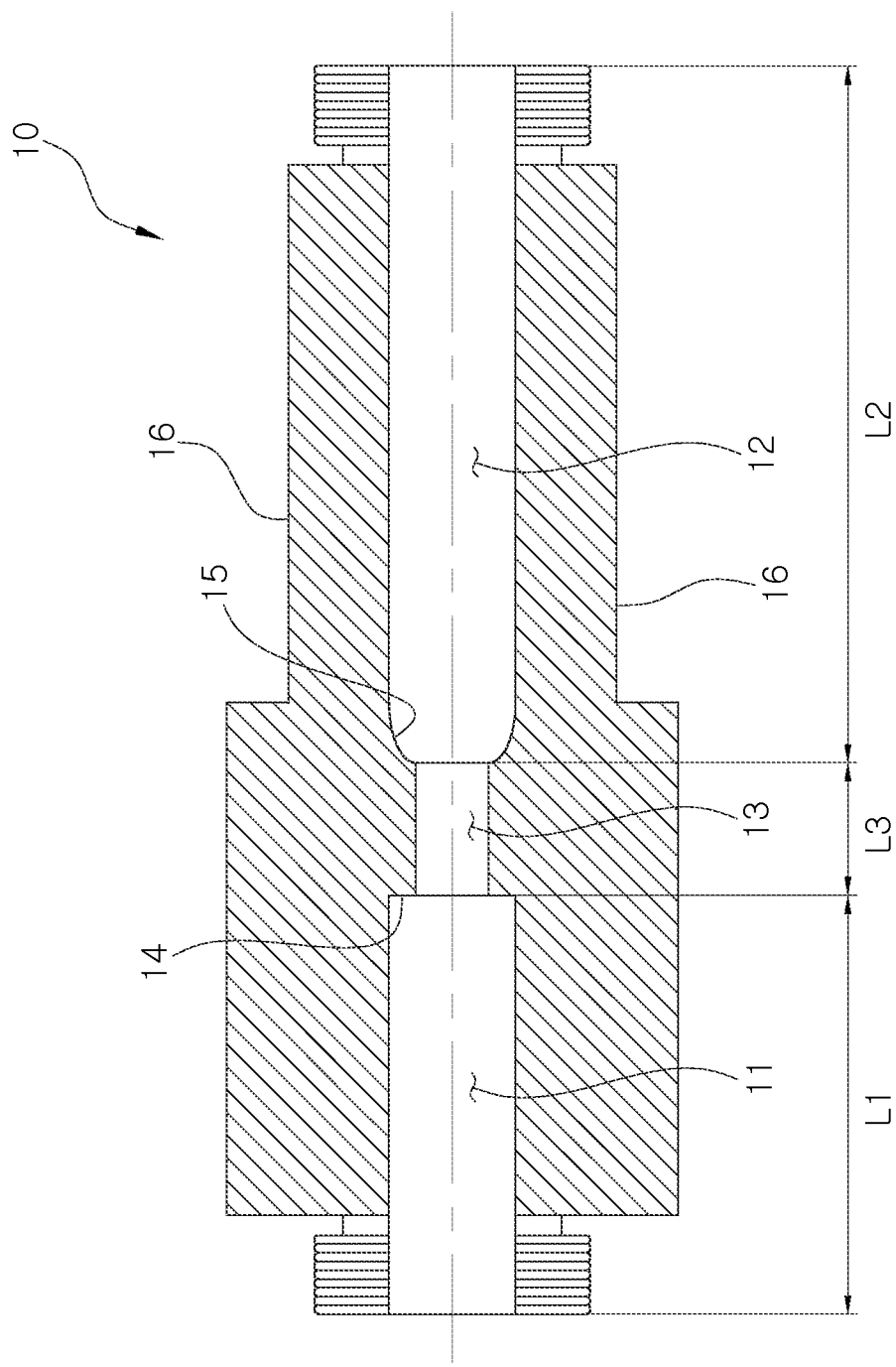
FIG. 2 is a cross-sectional view illustrating a reactor of an underwater plasma generating apparatus according to an embodiment of the present invention.
Figure 3:
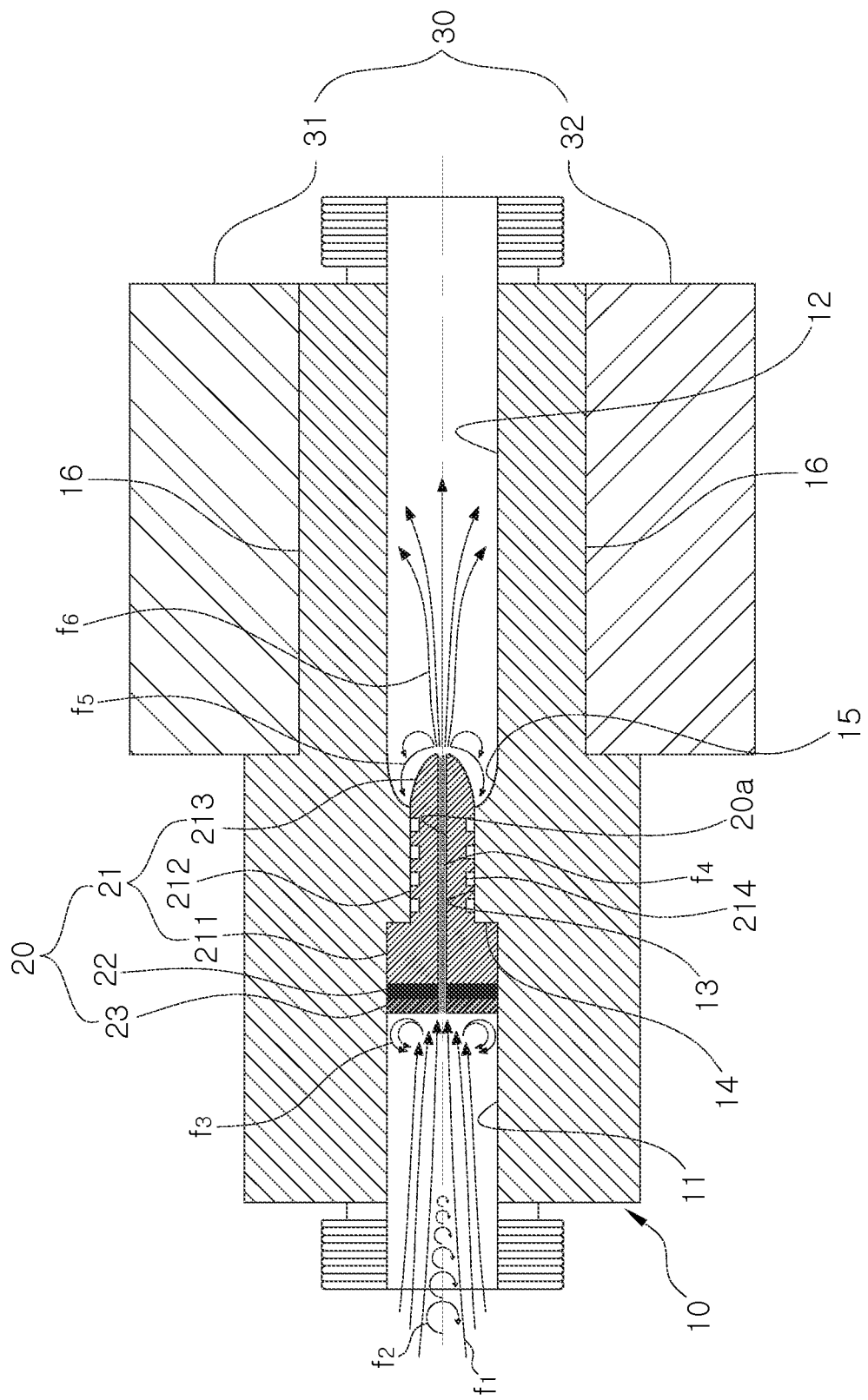
FIG. 3 is a cross-sectional view illustrating a state in which a dielectric insertion is disposed in a reactor of an underwater plasma generating apparatus according to an embodiment of the present invention.
Figure 4:
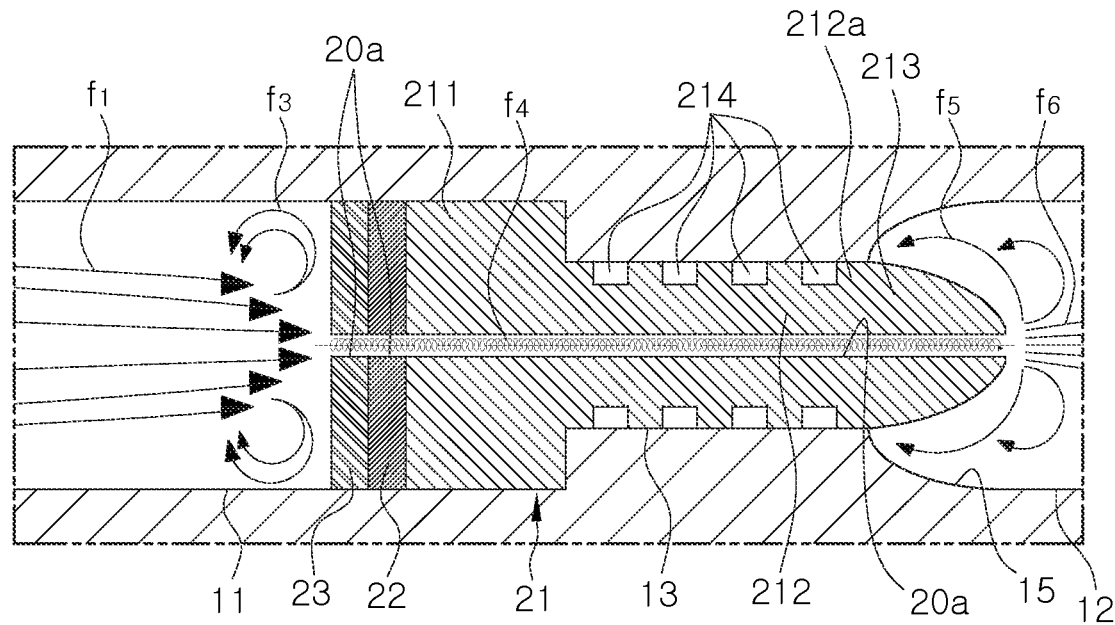
FIG. 4 is a cross-sectional view illustrating other embodiments of dielectric insertions.
Figure 4:
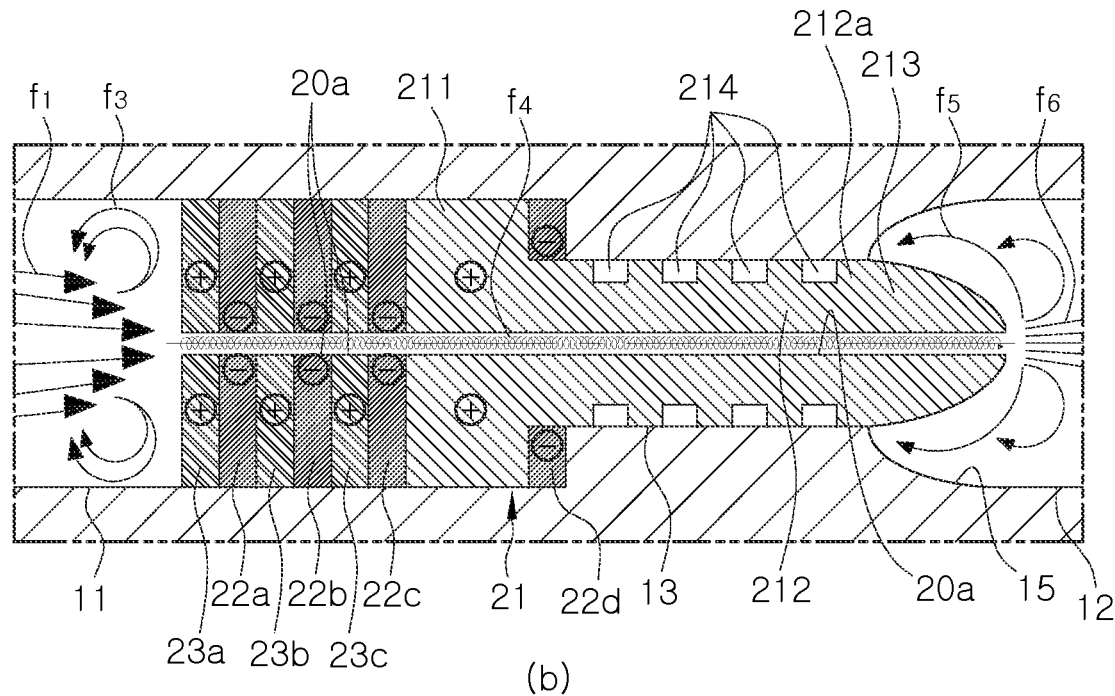
Figure 9:
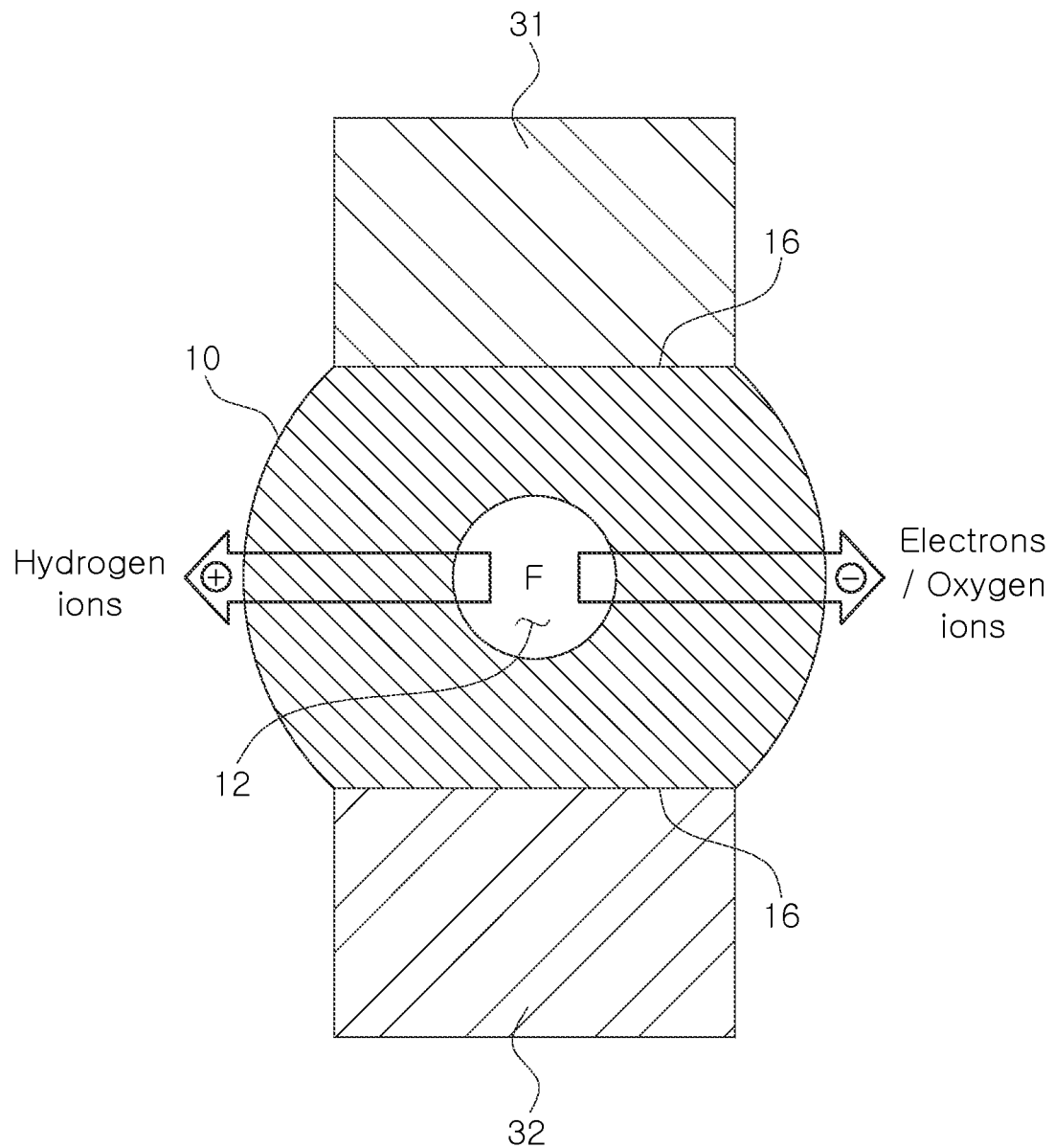
FIG. 9 is a longitudinal-sectional view illustrating an underwater plasma generating apparatus according to an embodiment of the present invention.
Figure 10:
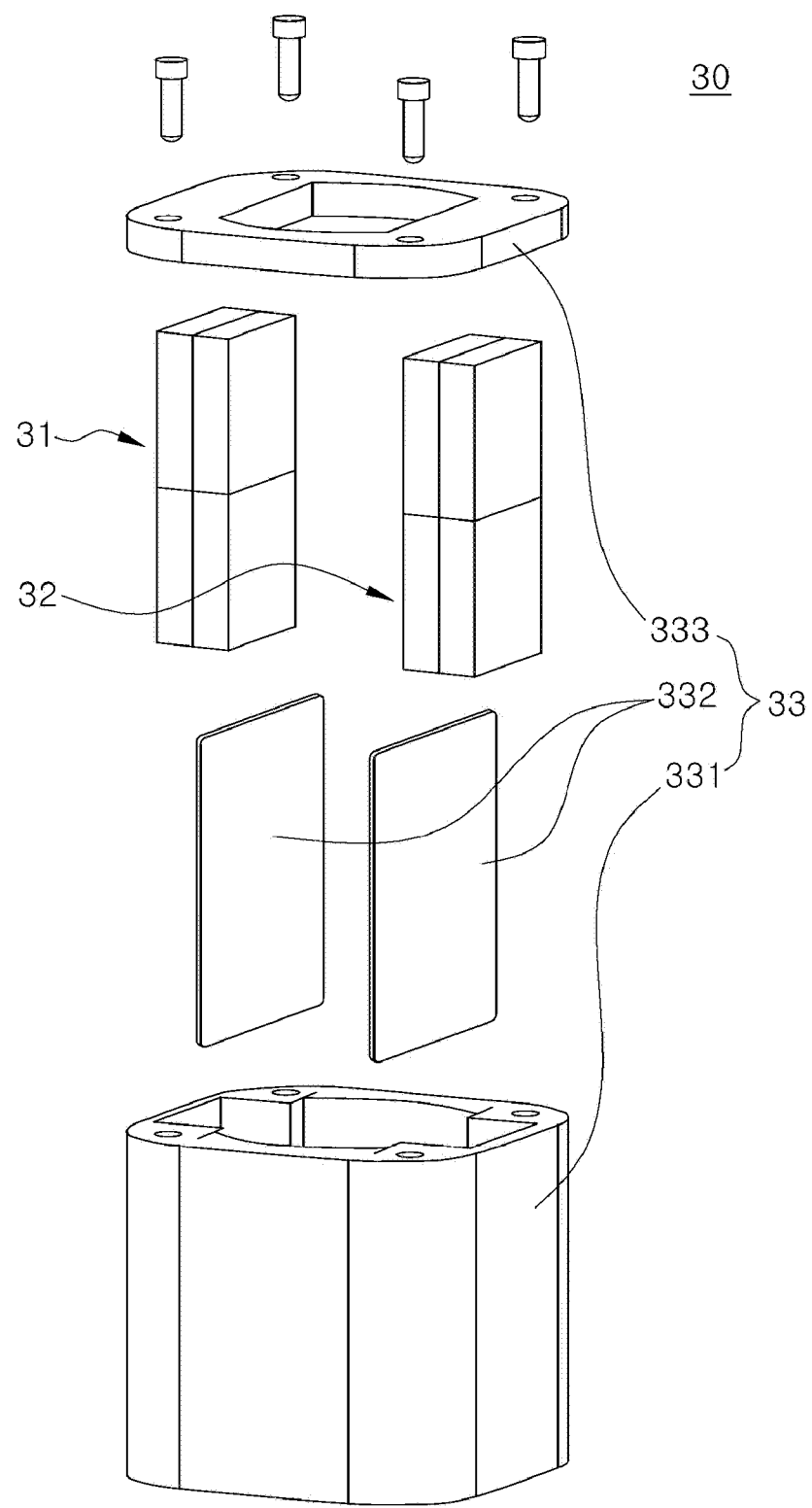
FIGS. 10 and 11 are views illustrating a magnetic substance fixing unit according to an embodiment of the present invention.
Figure 11:
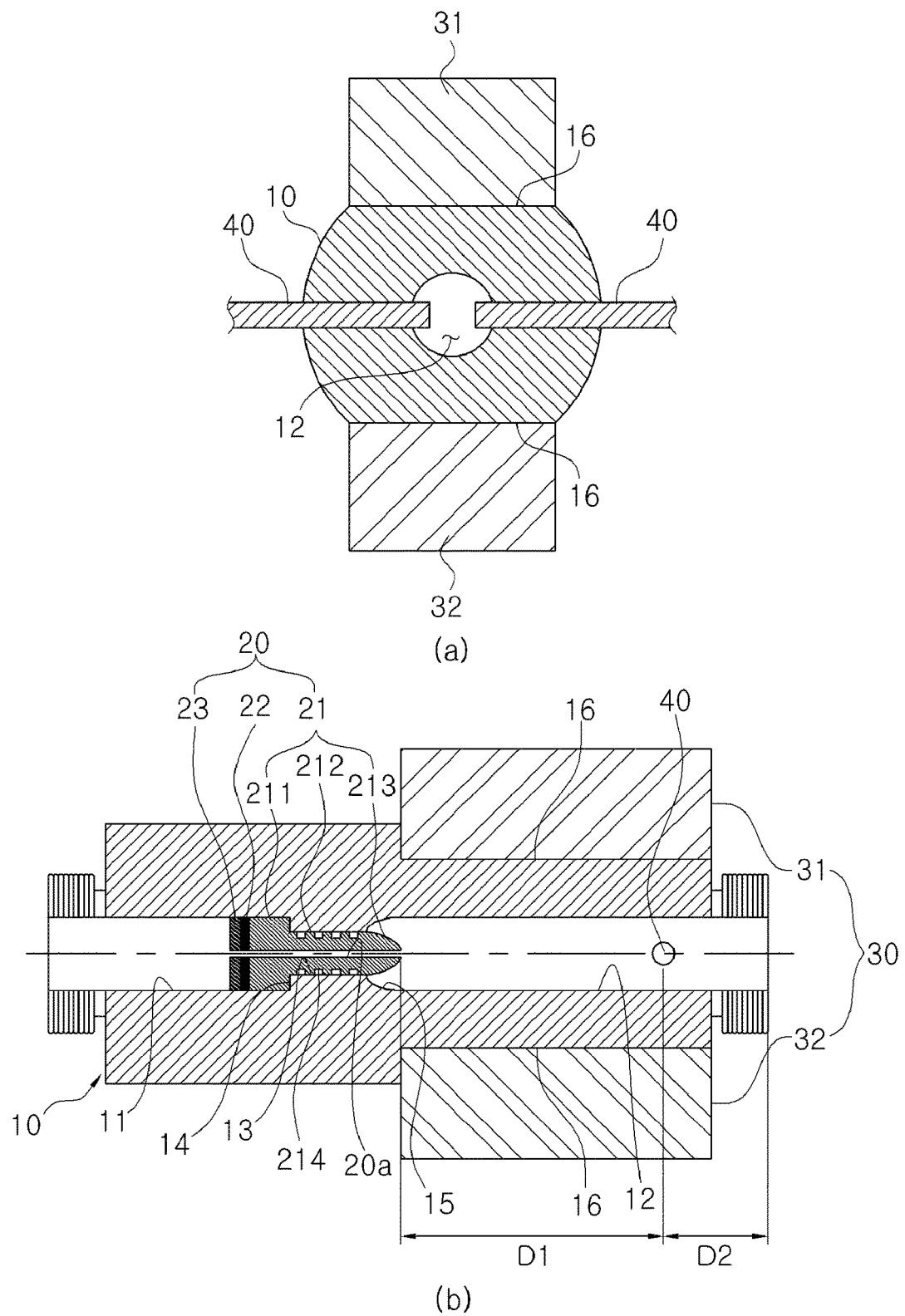
Figure 12:
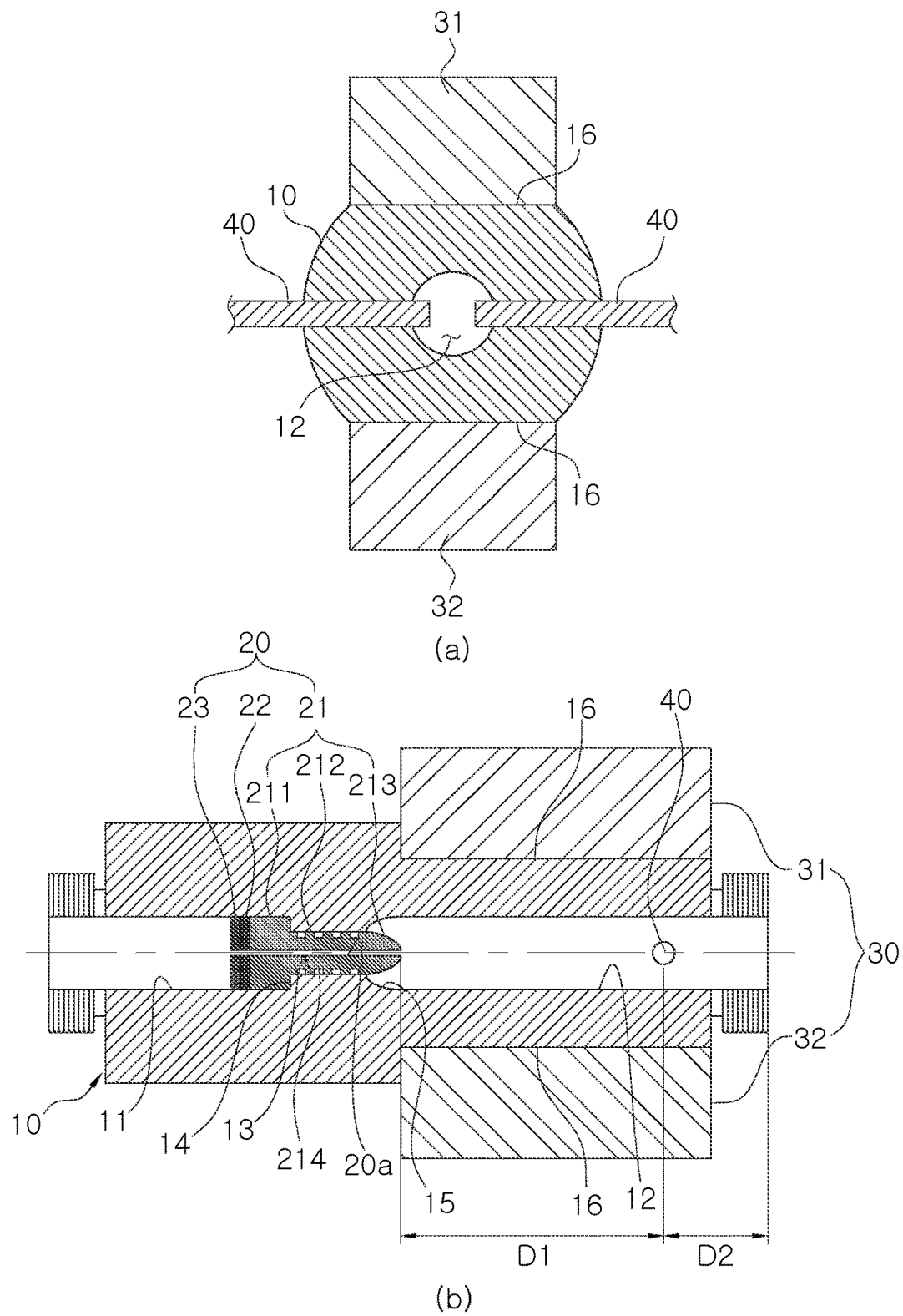
FIG. 12 is a view illustrating a state in which a metal probe is installed in an underwater plasma generating apparatus according to an embodiment of the present invention.

FIG. 1 is a diagram schematically illustrating an underwater plasma generating apparatus according to an embodiment of the present invention. FIG. 2 is a cross-sectional view illustrating a reactor of an underwater plasma generating apparatus according to an embodiment of the present invention. FIG. 3 is a cross-sectional view illustrating a state in which a dielectric insertion is disposed in a reactor of an underwater plasma generating apparatus according to an embodiment of the present invention. FIG. 4 is a cross-sectional view illustrating other embodiments of dielectric insertions. FIGS. 5 to 8 are views illustrating other embodiments of dielectric substances. FIG. 9 is a longitudinal-sectional view illustrating an underwater plasma generating apparatus according to an embodiment of the present invention. FIGS. 10 and 11 are views illustrating a magnetic substance fixing unit according to an embodiment of the present invention. FIG. 12 is a view illustrating a state in which a metal probe is installed in an underwater plasma generating apparatus according to an embodiment of the present invention.

Referring to FIGS. 1 and 2, an underwater plasma generating apparatus 1 (hereinafter, referred to as "underwater plasma generating apparatus 1) according to an embodiment of the present disclosure is a plasma generating apparatus which may generate a large amount of micro-nano bubbles in a working fluid moving in one direction and continuously generate plasma using the same and includes a reactor 10.

The reactor 10 is manufactured with a dielectric material having a permittivity and has a tubular structure through which a working fluid can pass. For example, translucent polycrystalline ceramics, engineering plastics, acryl, tantalum, quartz, pyrex, fiber glass, crystal, and the like may be applied as dielectric materials.

To be more specific, the reactor 10 is formed to have a tubular structure in which an inlet through which the working fluid is introduced is formed at one side, an outlet through which the working fluid is released is formed at the other side, and a flow path is formed to connect the inlet and the outlet along a length direction inside of the reactor to allow the working fluid to pass therethrough.

Here, the flow path may be divided into a plurality of sections with different lengths or different inner diameters.

Referring to FIGS. 2 and 3, the flow path may include a first flow path 11 which is connected to the inlet and accommodates a working fluid flowing in from the outside when the working fluid is supplied, a second flow path 12 which is connected to the outlet and is formed to be opposite to the first flow path 11 along an axial direction of the reactor 10, and accommodates the working fluid which passes through a dielectric insertion 20 to be described below, and a third flow path 13 which is formed between the first flow path 11 and the second flow path 12 to connect the first flow path 11 and the second flow path 12 with each other and is formed to have a relatively smaller inner diameter than those of the first flow path 11 and the second flow path 12. Here, a length L2 of the second flow path 12 may be formed to be longer than a length L1 of the first flow path 11 and a length L3 of the third flow path 13 and longer than a length obtained by connecting the length of the first flow path 11 and the length of the third flow path 13. By doing this, a magnetic field section formed in the second flow path 12 is formed to be longer by an ion separation unit 30 to be described below to maximize ion separation efficiency. For example, the flow path is formed to have a shape corresponding to an external shape of the dielectric insertion 20 and one section of the flow path and one section of the dielectric insertion 20 may be formed to have a polyhedral shape. By doing this, the insertion of the dielectric substance 21 is prevented from being rotated in the flow path and a position of a through hole 20a formed in a metal insertion 22 and a holding insertion 23 to be described below and a position of a through hole 20a formed in the dielectric insertion 20 are prevented from being deviated from each other. Further, an inner diameter of the first flow path 11 and an inner diameter of the second flow path 12 may be formed to have different sizes. By doing this, when an operator inserts the dielectric insertion 20 into the flow path, the confusion of the first flow path 11 and the second flow path 12 may be prevented.

Further, a locking protrusion 14 and a guide surface 15 may be formed in the reactor 10 which forms a flow path.

To be more specific, the locking protrusion 14 may be formed between the first flow path 11 and the third flow path 13 to lock and support the dielectric insertion 20 along a moving direction of the working fluid, and the guide surface 15 may be formed between the second flow path 12 and the third flow path 13 to be in contact with the working fluid which is ejected from the dielectric insertion 20 to flow back to the third flow path 13 to guide the movement of the working fluid.

Here, the guide surface 15 may be formed to have a structure with a curved surface bent with an arc shape toward a direction that the working fluid flows back or an inclined surface inclined with a straight line shape, so as to minimize the resistance due to the contact with the working fluid. Accordingly, the working fluid which is ejected from the dielectric insertion 20 to flow back is smoothly guided to the dielectric insertion 20 and minimize the friction between the backwardly flowing working fluid and an inner surface of the reactor 10 to prevent the damage of the reactor 10.

Further, a seating support groove 16 may be formed at an outside of the reactor 10.

The seating support groove 16 may be formed in a position corresponding to the second flow path 12 and may be formed to be dented with a predetermined depth from an end portion of the reactor 10 along the length direction of the reactor 10. The seating support groove 16 may be formed at one side and the other side of the reactor 10 along a direction perpendicular to an axial direction of the reactor 10 so that a first magnetic substance 31 and a second magnetic substance 32 of the ion separation unit 30 to be described below are provided to be opposite to each other. Accordingly, the ion separation unit 30 seated in the seating support groove 16 restrictively moves along the axial direction of the reactor 10 and may be disposed in a position corresponding to the second flow path 12. Further, the seating support groove 16 in which the ion separation unit 30 is installed may be formed to have the same length as the second flow path 12. Therefore, a length of the seating support groove 16 which is formed along the length direction of the reactor 10 is longer than a length of a section where the first flow path 11 and the second flow path 12 are formed. By doing this, a magnetic field section of the ion separation unit 30 is increased so that an ion separation effect may be improved.

Further, at one end portion and the other end portion of the reactor 10 at which the inlet and the outlet are formed, a plurality of fastening units with threads of screw formed on an outer circumferential surface may be provided for the connection with the other components. For example, a length of the fastening unit close to the inlet may be longer than a length of a fastening unit close to the outlet to withstand the high pressure working fluid flowing into the reactor 10. Further, an inner diameter of the inlet may be larger than an inner diameter of the outlet. However, the length and the size of the inner diameter of the fastening unit are not limited thereto and may vary in various forms and structures.

Further, a packing member (not illustrated) which maintains airtightness between the other components and the fastening units may be provided in each fastening unit of the reactor 10 to prevent the leakage of working fluid during the connection with the other components. For example, the packing member may be formed as an O-ring (an O-shaped rubber ring) or a gasket. However, the packing member is not necessarily limited to this shape, but may be modified in various forms.

A probe insertion hole (not illustrated) into which a metal probe 40 to be described below is inserted may be further formed in the reactor 10. The probe insertion hole is formed to have a size corresponding to an outer surface of the probe 40 and may be formed on a surface of the reactor 10 to pass through the reactor 10 so as to be connected to the second flow path 12.

Further, an opening/closing member (not illustrated) which selectively opens/closes the probe insertion hole may be further provided in the reactor 10.

The opening/closing member may include an insertion unit which is inserted into the probe insertion hole and a support unit which is provided at an outside of the insertion unit to be supported on an outer surface of the reactor 10 when the insertion unit is inserted into the probe insertion hole. For example, the opening/closing member may be formed of the same dielectric material as the reactor 10 or formed of an airtight member with a predetermined elastic force.

Accordingly, when the metal probe 40 is not provided in the reactor 10, an operator inserts the opening/closing member in the probe insertion hole to close the probe insertion hole so that it is possible to prevent the working fluid from leaking to the probe insertion hole.

Further, the underwater plasma generating apparatus 1 includes a dielectric insertion 20.

Referring to FIGS. 3 and 4, the dielectric insertion 20 is configured to be inserted into the reactor 10 to provide an environment required to generate the plasma by cavitation that electrons are emitted from the working fluid.

To be more specific, the dielectric insertion 20 is disposed in the flow path to partition the flow path into a plurality of spaces. Further, in the dielectric insertion 20, a through hole 20a which connects the plurality of partitioned spaces (a first flow path 11 and a second flow path 12) to each other and has a cross-sectional width smaller than the flow path (the first flow path 11) is formed. Here, a ratio of a diameter of the first flow path 11 and a diameter of the through hole 20a may be applied to be 10:1. However, the ratio of the diameter of the first flow path 11 and the diameter of the through hole 20a is not necessarily limited thereto, but may be applied to be at least any one of 10:0.5 and 10:4. Further, a metal catalyst (a metal insertion 22) which causes the friction with the working fluid flowing into the through hole 20a when the working fluid flows in to emit electrons to the micro-nano bubbles which pass through the through hole 20a together with the working fluid is provided at one side of the dielectric insertion 20.

Accordingly, as illustrated in FIG. 4, a large amount of micro-nano bubbles of 50 μm or smaller with a surface potential with a negative charge may be generated in the working fluid which flows into one space (first flow path 11) of the reactor 10 by the cavitation generated between the first flow path 11 and the through hole 20a. To be more specific, a large amount of micro-nano bubbles which is shrunk to 5 μm or smaller due to the cavitation is generated in the high pressure working fluid which flows into the first flow path 11, and negative potentials are rapidly increased on the surfaces of the large amount of micro-nano bubbles which is shrunk to 5 μm or smaller in accordance with a zeta potential characteristic. The large amount of micro-nano bubbles which flows into the through hole 20a together with the working fluid to pass through the metal catalyst (the metal insertion 22) continuously collapses due to the repulsive force between charges (negative (−) charges) of the surface potential and the same type of charges (negative (−) charges) emitted from the metal catalyst to generate plasma with a high density. Further, the working fluid which is ejected through the dielectric insertion 20 to move to the other space (second flow path 12) of the reactor 10 is exposed to the high density plasma to be ionized.

The dielectric insertion 20 will be described in more detail.

Figure 5:
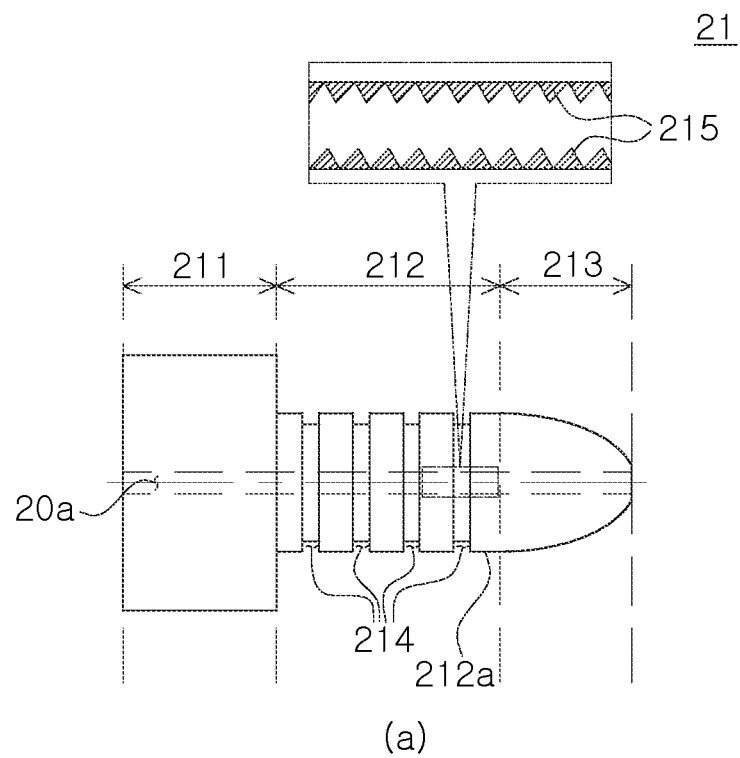
FIGS. 5 to 8 are views illustrating other embodiments of dielectric substances.
Figure 5:
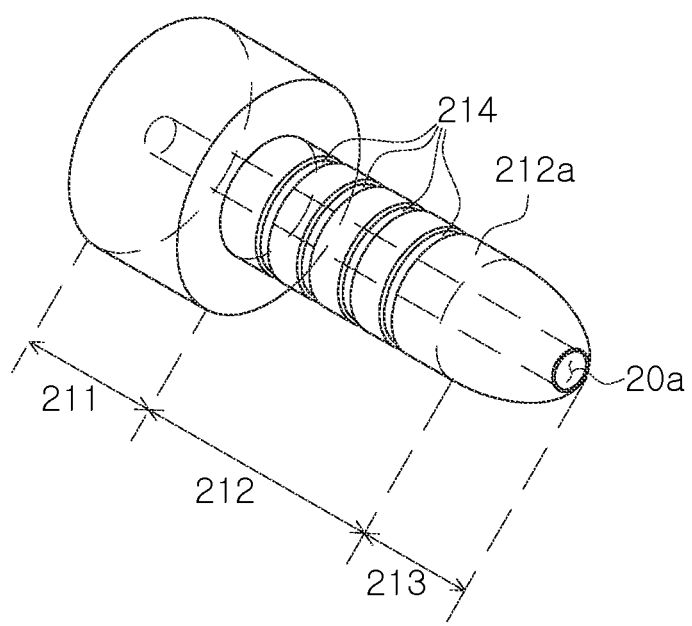

Referring to FIGS. 4 and 5, the dielectric insertion 20 is formed of a dielectric material with a predetermined permittivity and has a size corresponding to the first flow path 11 and the third flow path 13 to be accommodated over the first flow path 11, the second flow path 12, and the third flow path 13 and may include a dielectric substance 21 in which the through hole 20a is formed. For example, various dielectric materials having a predetermined permittivity, such as engineering plastics, acryl, quartz, pyrex, ceramics, fiber glass, and crystal may be applied for the dielectric substance 21.

The dielectric substance 21 accommodated in the reactor 10 may be divided into a first part 211, a second part 212, and a third part 213 depending on a position in the flow path.

The first part 211 is formed to have a size corresponding to the first flow path 11 to be accommodated in the first flow path 11. When the working fluid flows in, the first part 211 is pressurized by the working fluid so that one surface is caught by the locking protrusion 14 to be supported. For example, the first part 211 may be formed to have a cross-sectional size larger than the second part 212 and the third part 213 to be described below. That is, the first part 211 is formed to have a size corresponding to the first flow path 11 to be supported on an inner circumferential surface of the reactor 10 which forms the first flow path 11 and is caught by the locking protrusion 14 formed in the reactor 10 along the moving direction of the working fluid to be supported so that even though the working fluid flows therein, the first part 211 may stably maintain the fixed state without flowing due to the pressure of the working fluid.

The second part 212 extends with a predetermined length along an axial direction from the first part 211 and has a size corresponding to the third flow path 13 to be accommodated in the third flow path 13. For example, the second part 212 may be formed to be longer than the first part 211.

Further, in the second part 212, a collection groove 214 in which the working fluid flowing backwardly is accommodated may be formed.

The collection groove 214 may be formed to be dented with a predetermined depth toward the inside of the second part 212 from the outer circumferential surface of the second part 212 so that the working fluid which is ejected from the third part 213 to be described below to backwardly flow to the second part 212 along the surface of the third part 213 may flow therein.

Figure 6:
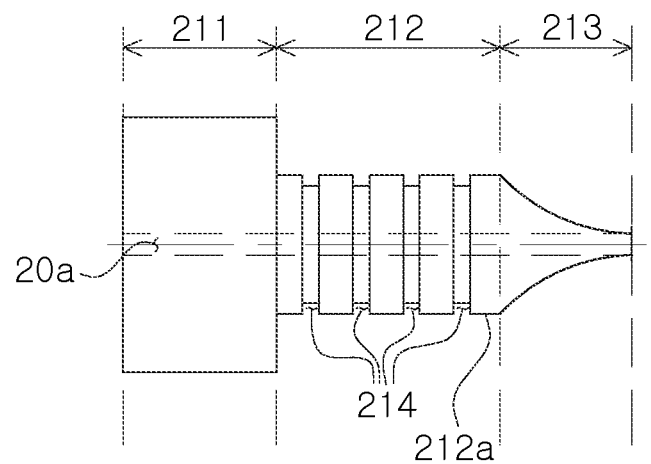
Figure 6:
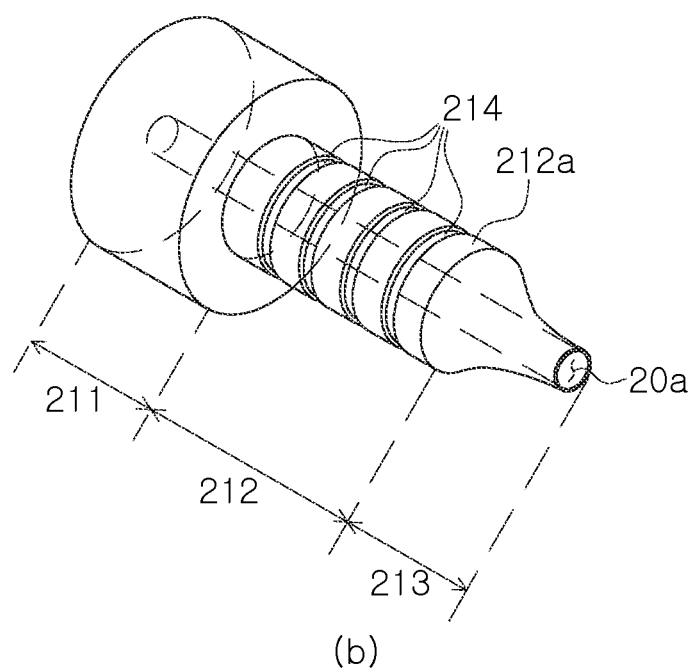
Figure 7:
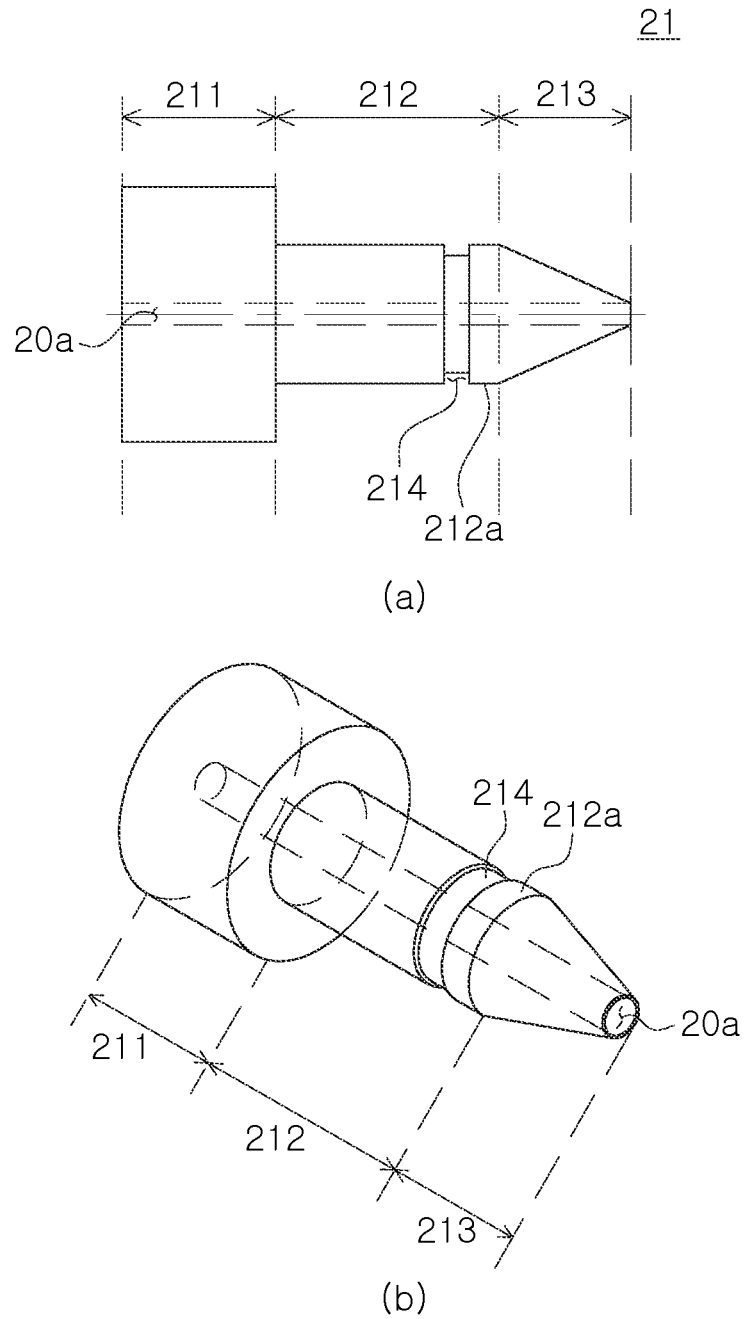
Figure 8:
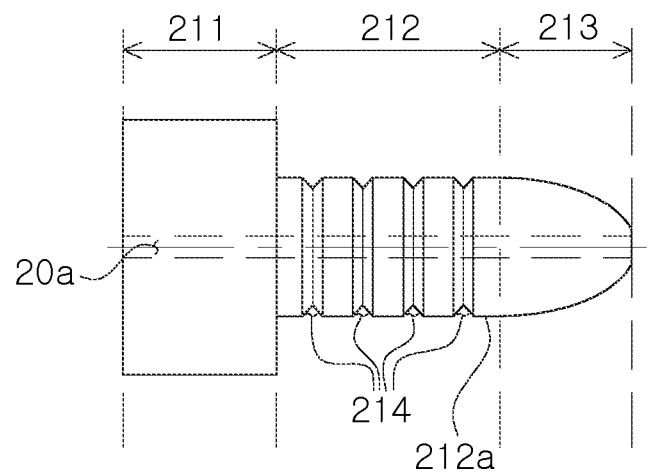
Figure 8:
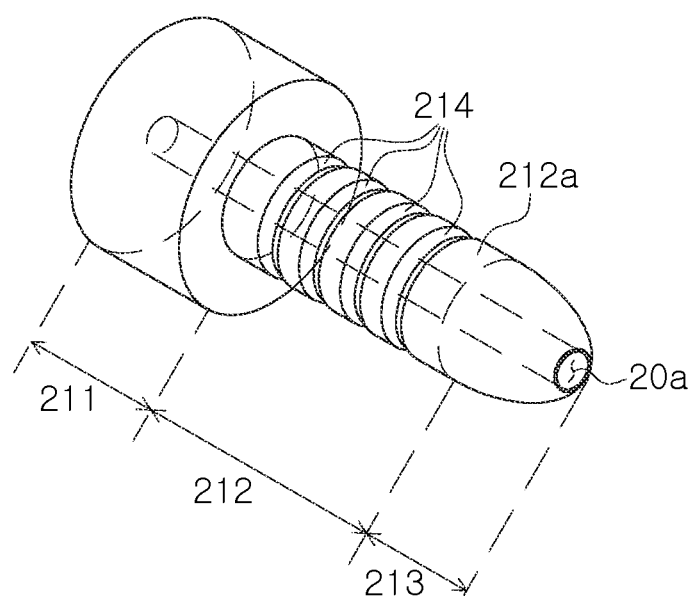

The collection groove 214 may be formed on the outer surface of the second part 212 as a singular form as illustrated in FIG. 7, or a plurality of collection grooves may be formed along the length direction of the second part 212 as illustrated in FIGS. 5, 6, and 8. Here, the plurality of collection grooves 214 formed along the length direction of the second part 212 may be formed in at least two positions along the length direction of the second part 212 and may be disposed to be spaced apart from each other with a constant interval.

In the meantime, referring to FIGS. 5 to 8, the collection grooves 214 may be formed in a position spaced apart from the third part 213 with a predetermined distance therebetween. That is, a block portion 212a is provided between the collection groove 214 formed to be adjacent to the third part 213 and the third part 213 to separate the collection groove 214 and the third part 213 and thus the flowing of the working fluid which flows in the collection groove 214 along the surface of the third part 213 may be minimized.

Further, the collection groove 214 may be formed to be etched with various shapes such as a V-shape or U shape, as illustrated in FIG. 8.

By doing this, the collection groove 214 provides a predetermined space for accommodating the working fluid to reduce the flowing backward of the working fluid to the first part 211. Further, the collection groove 214 is formed such that the working fluid easily flows in and out to allow the working fluid accommodated in the collection groove 214 to join the working fluid ejected through the third part 213. As a result, the generation of the plasma may be accelerated.

However, the collection groove 214 is not necessarily formed in the second part 212, but if necessary, the collection groove 214 may be selectively formed in the dielectric substance 21.

Referring to FIGS. 4 and 5 again, the third part 213 extends along the axial direction from the second part 212 with a predetermined length and is formed to have the same external shape size as the second part 212 to be accommodated in the second flow path 12. Further, the third part 213 may be formed to have a structure in which a size of the diameter is gradually reduced toward the moving direction of the working fluid.

That is, the third part 213 extends from the second part 212 to be exposed to the second flow path 12 and has a surface structure in which the size of the diameter is gradually reduced toward the moving direction of the working fluid to smoothly guide the working fluid which is ejected from the end portion to backwardly flow to the second part 212, thereby accelerating the plasma reaction.

Further, the surface of the third part 213 exposed to the second flow path 12 may be formed to have a curved shape which is outwardly bent. Therefore, the working fluid which is ejected through the third part 213 to backwardly flow may move to the second part 212 along the surface of the third part 213 formed with a curved shape.

However, the surface shape of the third part 213 is not limited thereto and may vary to have various structures and shapes.

Referring to FIG. 6, the surface of the third part 213 may be formed with a curved shape bent concave toward the inside. Therefore, the working fluid which is ejected through the third part 213 to backwardly flow may move to the second part 212 along the surface of the third part 213 formed with a curved shape bent concave toward the inside. Further, the working fluid which is ejected from the third part 213 to backwardly flow may be accelerated by a surface shape structure of the third part 213 described above and the flow of the working fluid continuously ejected from the third part 213.

Further, referring to FIG. 7, the surface of the third part 213 may be formed as an inclined surface. Therefore, the working fluid which is ejected through the third part 213 to backwardly flow may move to the second part 212 along the surface of the third part 213 formed with an inclined shape.

In the meantime, a vortex protrusion 215 may be further formed inside the dielectric substance 21 with the through hole formed therein.

Referring to FIG. 5, the vortex protrusion 215 may spirally protrude on the entire inner surface of the dielectric substance 21 along the length direction of the dielectric substance 21 so as to generate the vortex in the working fluid which passes through the through hole 20a. By doing this, the generation of micro-nano bubbles in the dielectric substance 21 may be further activated, and the collapse of micro-nano bubbles may be further accelerated.

Further, referring to FIGS. 3 and 4, the dielectric insertion 20 may further include a metal insertion 22 and a holding insertion 23.

The metal insertion 22 is accommodated in the first flow path 11 and is disposed in front of the dielectric substance 21 while being in contact with the dielectric substance 21 through one surface and when the working fluid flows therein, the metal insertion 22 comes into contact with the working fluid to emit electrons. For example, the metal insertion 22 may be formed of various metals, such as gold (Au), silver (Ag), nickel, copper, aluminum, platinum, palladium, and titanium. Further, the metal insertion 22 may be formed with a predetermined thickness and formed to have a size of an external shape corresponding to the first flow path 11. Further, inside of the metal insertion 22, a through hole 20a through which the working fluid may pass may be formed. For example, a spiral groove is formed inside the through hole 20a, so that when the working fluid passes, a vortex phenomenon (screw phenomenon) may be induced in the working fluid.

The holding insertion 23 is accommodated in the first flow path 11 to be disposed in front of the metal insertion 22 and maintained to be in contact with the metal insertion 22. When the working fluid flows in, the holding insertion 23 may be formed of a dielectric material having a predetermined permittivity so as to hold electrons discharged from the metal insertion 22. That is, the holding insertion 23 may serve to accumulate electrons generated from the metal insertion 22. For example, the holding insertion 23 may be formed of a dielectric material having a predetermined permittivity, such as engineering plastics (PC), acryl, quartz, pyrex, ceramics, fiber glass, and crystal. Further, the holding insertion 23 may be formed with a predetermined thickness and formed to have a size of an external shape corresponding to the first flow path 11. Further, inside of the holding insertion 23, a through hole 20a through which the working fluid passes may be formed. For example, a spiral groove is formed inside the through hole 20a, so that when the working fluid passes, a vortex phenomenon (screw phenomenon) may be induced in the working fluid.

The underwater plasma generating apparatus 1 may further include an ion separation unit 30.

Referring to FIGS. 3 and 9, the ion separation unit 30 is provided on an outer surface of the reactor 10 corresponding to the other space (second flow path 12) of the reactor 10 in which the working fluid passing through the dielectric insertion 20 is accommodated and applies a magnetic field to the flow of the working fluid ionized by the plasma to separate the ions included in the working fluid depending on the electrical polarity.

That is, the ion separation unit 30 may apply the magnetic field to the flow of the working fluid ionized through the plasma to separate H$^+$ ions and OH$^-$ ions from the working fluid. In this case, the working fluid supplied to the reactor 10 may be hard water (H$_2$O) having a specific resistance of $10^4$ ω·cm or higher or a mixed fluid in which hard water and heavy water (D$_2$O) are mixed.

The ion separation unit 30 will be described in more detail.

The ion separation unit 30 may include a plurality of magnetic substances which is disposed on an outer surface of the reactor 10 to be opposite to each other.

The plurality of magnetic substances may include a first magnetic substance 31 which is provided on one outer surface of the reactor 10 along a direction perpendicular to the axial direction of the reactor 10 and has an S polarity and a second magnetic substance 32 which is provided on the other outer surface of the reactor 10 to be opposite to the first magnetic substance 31 and has an N polarity. By doing this, the ion separation unit 30 may apply a magnetic field to the flow of the working fluid and separate the ions included in the working fluid to be perpendicular to a direction of the magnetic field from the flow of the working fluid in accordance with the electrical polarity. In the meantime, unlike illustrated in the drawings, the first magnetic substance 31 and the second magnetic substance 32 may be disposed in opposite positions along the direction perpendicular to the axial direction of the reactor 10 so that the S polarity and the N polarity are disposed in opposite positions. By doing this, the direction of the ions which are separated by the ion separation unit 30 to move together with the working fluid may be changed.

Further, the ion separation unit 30 may further include a magnetic substance fixing unit 33.

Referring to FIGS. 10 and 11, the magnetic substance fixing unit 33 may accommodate the first magnetic substance 31 and the second magnetic substance 32 therein to be fixed. To be more specific, the magnetic substance fixing unit 33 may restrict the movement of the first magnetic substance 31 and the second magnetic substance 32 to the axial direction of the reactor 10 and the direction perpendicular to the axial direction of the reactor 10. The magnetic substance fixing unit 33 may be coupled to an outer surface of the reactor 10 as a module.

The magnetic substance fixing unit 33 may include a housing 331, a diaphragm 332, and a bracket 333.

The housing 331 has an accommodating space for accommodating the reactor 10, the first magnetic substance 31, and the second magnetic substance 32 formed therein and is coupled to the outside of the reactor 10 along the axial direction of the reactor 10 to be fixed onto the outer surface of the reactor 10. For example, the housing 331 may be formed to have a length corresponding to the other space (second flow path 12) of the reactor 10. However, the length of the housing 331 is not necessarily limited thereto, but if necessary, may be formed to have a length shorter than the length of the outer surface of the reactor 10.

The diaphragm 332 is coupled to the inside of the housing 331 to partition the accommodating space into a plurality of spaces and supports the first magnetic substance 31 and the second magnetic substance 32 to restrict the movement of the first magnetic substance 31 and the second magnetic substance 32 to the direction perpendicular to the axial direction of the reactor 10. For example, the diaphragm 332 is formed with a plate-shaped structure with a predetermined thickness and formed of a SUS material. The accommodating space of the housing 331 may be partitioned into a first accommodating space which accommodates the reactor 10 by the diaphragm 332, a second accommodating space which is connected to the first accommodating space to accommodate the first magnetic substance 31 and the second magnetic substance 32, respectively, and a third accommodating space in which the bracket 333 to be described below is inserted to be fixed.

The bracket 333 is fastened with one end portion of the housing 331 along an axial direction of the housing 331 by means of a plurality of fastening units to restrict the movement of the first magnetic substance 31 and the second magnetic substance 32 to the axial direction of the reactor 10 and may include a through hole through which the reactor 10 passes. Further, a plurality of through holes through which the plurality of fastening units passes may be further formed in the bracket. Further, the bracket 333 may be formed of a material which blocks a magnetic force of the magnetic substance, such as lead.

The underwater plasma generating apparatus 1 may further include a metal probe 40.

Referring to FIG. 12A, a plurality of metal probes 40 is provided to be disposed to be opposite in a direction perpendicular to a direction in which the first magnetic substance 31 and the second magnetic substance 32 are disposed to be opposite and passes through the reactor 10 so that a part of the metal probes may be accommodated in the other space (second flow path 12) of the flow path. Accordingly, when a capacitor is connected to the plurality of metal probes 40, a high voltage electric energy may be acquired. For example, the metal probe 40 may be formed of various metal materials such as silver, copper, aluminum, gold, or nickel.

In the meantime, referring to FIG. 12B, in the other space (second flow path 12) of the flow path, a distance D1 between the end portion of the dielectric insertion 20 and the metal probe 40 may be longer than a distance D2 between the metal probe 40 and an end portion of the reactor 10.

The underwater plasma generating apparatus 1 may further include a purifying unit (not illustrated) and a power unit (not illustrated).

The purifying unit may purify the working fluid. As the working fluid, hard water, a mixed fluid of hard water and heavy water, or hydrocarbon oil may be used and if hard water is used, the working fluid may be purified in the range of a specific resistance of $10^4 \omega \cdot cm$ or higher. Further, when a mixed fluid in which hard water and heavy water are mixed is used as a working fluid, heavy water may be mixed by 0.01% to 100% of hard water. Further, hydrocarbon oil or mineral oil is used, it is desirable that the viscosity is 40 or less.

The power unit may supply power to supply the working fluid purified in the purifying unit into the reactor 10. That is, the power unit rotates a pump to be described below which is disposed at one side of the power unit to transmit the working fluid to the reactor 10 at a predetermined pressure.

The underwater plasma generating apparatus 1 may further include a pump (not illustrated), a storage tank (not illustrated), and a flow rate control unit (not illustrated).

The pump is disposed at one side of the power unit and receives the power from the power unit to transmit the working fluid to the reactor 10 at a predetermined pressure. For example, the working fluid stored in the storage tank to be described below is transmitted from the storage tank to the pump as the pump drives and the working fluid transmitted to the pump may be supplied to the reactor 10.

The storage tank may store the working fluid which passes through the reactor 10 and a temperature control unit to be described below and supply the working fluid to the pump. For example, in the storage tank, a partition which stabilizes a state of circulating and flowing-in working fluid may be provided. Further, in the storage tank, a heat exchanger (not illustrated) may be further provided to control the temperature.

The flow rate control unit is disposed in the middle of introducing from the storage tank to the reactor 10 to control a flow rate of the working fluid which flows into the reactor 10. For example, the flow rate control unit may be disposed between the pump and the reactor 10.

The underwater plasma generating apparatus 1 may further include an accumulator (not illustrated), a fluid moving unit (not illustrated), a measurement unit (not illustrated), and a control panel (not illustrated).

The accumulator is installed between the flow rate control unit and the reactor 10 and may prevent a pulsation phenomenon that since the working fluid does not constantly flow, the plasma is momentarily cut off and then generated again. For example, two or more accumulators may be provided to reduce the pulsation phenomenon.

The fluid moving unit is formed as a pipe which connects the above-described devices such as the purifying unit, the reactor 10, and the storage tank and may include a flow path in which the working fluid circulates. For example, the fluid moving unit may be formed of a dielectric material.

The measurement unit is disposed in any one of the inlet and the outlet of the reactor 10, and the fluid moving unit and may measure a pressure and a temperature of the working fluid. By doing this, the measured pressure and temperature of the working fluid may be used to control the pressure and the temperature of the working fluid. For example, when the temperature and the pressure of the working fluid measured at the inlet of the reactor 10 do not reach a pressure and a temperature sufficient to generate the plasma, the pump (not illustrated) is controlled to increase the pressure. Further, the measurement unit may stop reducing the temperature of the working fluid by the temperature control unit (not illustrated) to be described below. Further, the measurement unit disposed in the fluid moving unit which is introduced into the temperature control unit measures the temperature of the working fluid to measure a temperature of the working fluid which rises in accordance with a frictional heat and plasma generated in the reactor 10. The measured temperature may be used as data for controlling a temperature of the working fluid in the temperature control unit.

The control panel may include a power device which turns on or off the underwater plasma generating apparatus 1 and a manipulation device which adjusts the pressure and the temperature of the working fluid. The control panel may further include a display panel which displays a pressure and a temperature measured by the above-described measurement unit.

The underwater plasma generating apparatus 1 may further include a branched pipe (not illustrated).

The branched pipe is connected to the other side of the reactor 10 to guide ions separated by the ion separation unit 30 to different directions together with the working fluid. For example, the branched pipe may be formed of a dielectric material.

Hereinafter, flow of the working fluid, operations of insertions associated with the flow of the working fluid, a formation process of micro-nano bubbles, and a collapse process will be described by referring to FIGS. 3 and 4.

For reference, respective components for describing the flow of the working fluid, the operations of insertions associated with the flow of the working fluid, the formation process of micro-nano bubbles, and the collapse process will be described with the same reference numerals used for description of the underwater plasma generating apparatus 1 for the convenience of description and the same or repeated description will be omitted.

First, the flow of the working fluid, the operations of insertions associated with the flow of the working fluid, the formation process of micro-nano bubbles, and the collapse process through the dielectric insertion 20 according to an embodiment will be described.

Referring to FIGS. 3 and 4A, the dielectric insertion 20, the metal insertion 22, and the holding insertion 23 may be sequentially inserted through the first flow path 11 of the reactor 10. When the dielectric insertion 20 is inserted, the third part 213 may be inserted first into the first flow path 11.

When the underwater plasma generating apparatus 1 operates, the high pressure working fluid flows into the inlet of the reactor 10. In this case, since the working fluid flows in at a high pressure, the dielectric insertion 20, the metal insertion 22, and the holding insertion 23 are sequentially brought into contact with each other.

The working fluid may form first flows f1 which are introduced into the reactor 10 and linearly flow toward the through hole and a second flow f2 in which vortex is formed between the first flows f1. Since a diameter of the through hole 20a formed in the dielectric insertion 20, the metal insertion 22, and the holding insertion 23 is relatively much smaller than a diameter of the first flow path 11 of the reactor 10 through which the working fluid flows, the working fluid which is close to the through hole 20a of the holding insertion 23, but does not flows into the through hole 20a may have a third flow f3 which forms a vortex. The third flow f3 may be incorporated into the first flow f1 again to be introduced into the through hole 20a.

The working fluid introduced into the through hole 20a may form a fourth flow f4 which forms a vortex by a spiral groove formed in the through hole 20a of the metal insertion 22, the holding insertion 23, and the dielectric insertion 20. The working fluid introduced into the through hole 20a may flow while causing friction with the metal insertion 22. A large number of electrons is discharged from the metal insertion 22 by the friction. Some of the electrons emitted from the metal insertion 22 flows together with the working fluid and the other of the emitted electrons is accumulated in the holding insertion 23.

The working fluid introduced into the through hole 20a may form micro-nano bubbles by the cavitation due to the very narrow diameter. More micro-nano bubbles may be formed while passing through the through hole 20a. Further, the formed micro-nano bubbles remain in the working fluid and may collapse when the working fluid passes through the through hole 20a of the dielectric insertion 20. Plasma is mainly generated in the through hole 20a of the second part 212 of the dielectric insertion 20 and the second flow path 12 by the collapse of micro-nano bubbles and electrons charged to the working fluid.

Here, the micro-nano bubble generally refers to a bubble having a diameter of 50 μm or less. Micro-nano bubbles are formed by being surrounded by a gas-liquid interface, and the surface tension of water acts on the interface. The surface tension acts as a force which compresses the inside of the bubble. The increase in pressure in the bubble according to an environmental pressure may be theoretically calculated by the following Equation 1.

$$\Delta P = 4\sigma/D \qquad \text{<Equation 1>}$$

Here, $\Delta P$ is a degree of increased pressure, $\sigma$ is a surface tension, and D is a diameter of bubble.

<Table 1>

| Diameter μm | $\Delta P$ kg/cm2 |
|---|---|
| 10 | 0.3 |
| 1 | 3 |
| 0.1 | 30 |
| \| | \| |
| 0 | ∞ |

Referring to Table 1, a micro-nano bubble with a diameter of approximately 10 μm has an internal pressure of approximately 0.3 atm and a micro-nano bubble with a diameter of approximately 1 μm has a pressure of approximately 3 atm. Further, the ion concentration is increased at the interface. When the micro-nano bubble collapses, ultrasonic waves of approximately 40 KHz, high sound pressure of approximately 140 db, and instantaneous high heat from 4000° C. to 6000° C. occur. The micro-nano bubbles collapse due to the ultrasonic waves, the high sound pressure, the instantaneous high heat, and suspended electrons in the working fluid, to generate the plasma.

In the case of working fluid such as oil or water, when a traveling speed of the working fluid increases and a local pressure is lower than a vapor pressure, the working fluid is vaporized and a cavity is generated.

Normal bubbles rise to a water surface to be ruptured at the surface, but when the bubbles have a micro (μm) nano-size close to a size of an atom or molecule, the bubbles have different behaviors or properties in the same material. The same phenomenon occurs in the bubbles. Micro-nano bubbles which are equal to or smaller than 50 μm (0.05 mm) shrink in the water and finally disappear, and during this process, at least three successive steps: nucleation, bubble growth, and implosion collapse under appropriate conditions are performed.

During this process, the micro-nano bubbles are exaggeratively grown so that the micro-nano bubbles cannot absorb the energy to maintain the micro-nano bubbles itself and are violently imploded by "rapidly collapse". The temperature and the pressure discharged during the collapse step enormously increase such that the molecules of the trapped gases break apart, which is also the basis for "uniform ultrasonic chemistry".

Further, the micro-nano bubbles have electric charges and move in zigzag as the micro-nano bubbles rise according to the electric field around them. In this case, the micro-nano bubbles cause slight vibration and repeat the chain reaction of compression and collapse in a short time of approximately 1 μsec (1/1,000,000 seconds) by the "self-pressurization effect".

Further, the self-pressurization effect is generated by force which compresses the gas by the surface tension in the micro-nano bubbles with a spherical interface and when the bubbles expand or collapse, the strong pressure and temperature in the collapsed bubbles may become high enough to trigger the nuclear reaction. At this time, the internal temperature of the micro-nano bubbles instantaneously rises to 5,500° C. comparable to the temperature of the solar surface, a collapse (implosion) speed of a wall of the micro-nano bubble is accelerated to 7,000 m/sec, and the shock wave reaches 11,000 m/sec and emits intense light reaching 20,000 K to 30,000 K (Kelvin temperature), which is the generation of plasma.

The destructive power of micro-nano bubbles is well demonstrated in everyday life related to water or other fluids. For example, cavitation occurs as the traveling speed of the fluid flowing on the surface of a propeller or a hull is increased by the rotation of the propeller in the water and a local pressure is lower than a vapor pressure. During this process, a lot of micro-nano bubbles are generated, and the generation and the collapse are continuously repeated. Tremendous energy generated whenever these micro-nano bubbles collapse damages the surfaces of metal propellers, hulls, and pumps, which causes enormous obstacles to the ship's operation. The destructive force of the micro-nano bubbles has been proved by this result.

The working fluid which passes through the through hole 20a of the dielectric insertion 20 is emitted to the front of the third part 213, that is, toward the outlet of the reactor 10. A part of the emitted working fluid forms a fifth flow f5 which flows backwardly toward the second part 212 along the surface of the third part 213 and the other part of the emitted working fluid forms a sixth flow f6 which flows to the front of the third part 213.

The working fluid in accordance with the fifth flow f5 may flow into a minute gap between the third flow path 13 and the second part 212 of the dielectric insertion 20. As mentioned above, a diameter of the second part 212 of the dielectric insertion 20 is formed so as to correspond to the third flow path 13. Therefore, the dielectric insertion 20 needs to be inserted into the reactor 10 so that the second part 212 of the dielectric insertion 20 and the second flow path 12 of the reactor 10 are in close contact with each other. Otherwise, a large amount of working fluids backwardly flows through the third flow path 13 so that the efficiency of the generation of the plasma may be degraded.

The working fluid which flows backwardly between the third flow path 13 and the dielectric insertion 20 is introduced into the collection groove 214 formed in the second part 212 of the dielectric insertion 20. The introduced working fluid remains in the collection groove 214 and when the sixth flow f6 becomes strong, escapes to the second flow path 12 between the third flow path 13 and the dielectric insertion 20 to strengthen the sixth flow f6. In this case, the micro-nano bubbles included in the working fluid which remains in the collection groove 214 may collapse to generate much more plasmas.

As described above, the collection groove 214 may perform both the functions of providing a space for remaining the backwardly flowing working fluid and strengthening the plasma generated in the second flow path 12.

Next, the flow of the working fluid, the operations of insertions associated with the flow of the working fluid, the formation process of micro-nano bubbles, and the collapse process through the dielectric insertion 20 according to another embodiment will be described.

In the case of the dielectric insertion 20, the metal insertions 22a, 22b, 22c, and 22d, and the holding insertions 23a, 23b, and 23c in the reactor 10 illustrated in FIG. 4B, as compared with the inside of the reactor 10 illustrated in FIG. 4A, only the length of the dielectric insertion 20 and the number of the metal insertions 22a, 22b, 22c, and 22d, and the number of the holding insertion 23a, 23b, and 23c are different, but the other components are substantially the same. Therefore, a redundant description will be omitted.

Referring to FIG. 4B, the number of dielectric insertions 20 inserted into the reactor 10 is one and a total number of metal insertions 22a, 22b, 22c, and 22d is four, and a total number of holding insertions 23a, 23b, and 23c is three. However, the number of metal insertions 22a, 22b, 22c, and 22d and the number of holding insertions 23a, 23b, and 23c may vary depending on the necessary.

The second part 212 of the dielectric insertion 20 is formed to be longer than the dielectric insertion 20 illustrated in FIG. 4A. This is because a fourth metal insertion 22d is further inserted close to the second part 212 of the dielectric insertion 20. Specifically, the fourth metal insertion 22d is first inserted to a front surface of the dielectric insertion 20 while passing through the second part 212 of the dielectric insertion 20. The dielectric insertion 20 is inserted into the reactor 10 with the fourth metal insertion 22d fitted on the front surface. Accordingly, the second part 212 may be formed to be longer as much as the thickness of the fourth metal insertion 22d so that a starting part of the third part 213 starts from the second flow path 12. However, unlike illustrated in the drawing, the second part 212 of the dielectric insertion 20 may not be formed to be longer.

The inner diameter of the fourth metal insertion 22d corresponds to an outer diameter of the second part 212 of the dielectric insertion 20 and an outer diameter of the fourth metal insertion 22d corresponds to an inner diameter of the reactor 10. The fourth metal insertion 22d is in contact with the locking protrusion 14 on a front surface while being fitted into the first flow path 11 and is in contact with the first part 211 of the insertion of the dielectric substance 21 on a rear surface.

After inserting the dielectric insertion 20 to which the fourth metal insertion 22d is fitted into the reactor 10, the first to third metal insertions 22a, 22b, and 22c excluding the fourth metal insertion 22d and the first to third holding insertions 23a, 23b, and 23c are sequentially and alternately inserted into the reactor 10. Specifically, the dielectric insertion 20, the third metal insertion 22c, the third holding insertion 23c, the second metal insertion 22b, the second holding insertion 23b, the first metal insertion 22a, and the first holding insertion 23a are sequentially inserted into the reactor 10.

Hereinafter, the flow of the working fluid and an operation of each insertion associated with the flow of the working fluid will be described.

As described above, the high pressure working fluid flows into the reactor 10 in which the dielectric insertion 20, the metal insertions 22a, 22b, 22c, and 22d and the holding insertions 23a, 23b, and 23c are inserted through the first flow path 11 of the reactor 10.

As described above, the working fluid may form a first flow f1 which flows through the through hole 20a formed in the dielectric insertion 20, the metal insertions 22a, 22b, 22c, and 22d and the holding insertions 23a, 23b, and 23c and a third flow f3 which hits the outer surface of the first holding insertion 23a to form a vortex.

The working fluid flowing into the through hole 20a may form a fourth flow f4 which becomes a vortex by a spiral groove formed on the through hole 20a of the holding insertions 23a, 23b, and 23c, the first to third metal insertions 22a, 22b, and 22c, and the dielectric insertion 20.

The fourth flow f4 is in contact with the first holding insertion 23a, the first metal insertion 22a, the second holding insertion 23b, the second metal insertion 22b, the third holding insertion 23c, and the third metal insertion 22c, in this order. By doing this, a large amount of electrons is introduced from the individual metal insertions 22a, 22b, and 22c to the working fluid, and some of the emitted electrons is accumulated in the holding insertions 23a, 23b, and 23c, and the other emitted electrons are emitted through the third part 213 together with the fourth flow f4.

A part of the working fluid which is emitted toward the front side of the third part 213 forms a fifth flow f5 which backwardly flows toward the second part 212 along a surface of the third part 213. The other part of the working fluid emitted to the front side of the third part 213 forms a sixth flow f6 which flows to the front side of the third part 213.

In this case, the fifth flow f5 may flow into a minute gap between the third flow path 13 and the second part 212 of the dielectric insertion 20. The working fluid which backwardly flows between the third flow path 13 and the dielectric insertion 20 flows into the collection groove 214 of the dielectric insertion 20.

When the sixth flow f6 becomes strong as described above, the working fluid flowing in the collection groove 214 may escape to the second flow path 12 between the third flow path 13 and the dielectric insertion 20.

In the meantime, the working fluid introduced in the collection groove 214 and the working fluid which backwardly flows to the gap between the third flow path 13 and the dielectric insertion 20 are in contact with the fourth metal insertion 22d disposed at an inner end of the first flow path 11 and then may form the plasma again. Specifically, the working fluid flowing in the collection groove 214 meets the working fluid which backwardly flows to the gap of the third flow path 13 and the dielectric insertion 20 to flow in the first flow path 11. In this case, the working fluid is in contact with the fourth metal insertion 22d disposed at the inner end of the first flow path 11 and may be supplied with electrons.

The fourth metal insertion 22d as described above may reduce soot and damage of the dielectric insertion 20 which may be caused when the working fluid flowing into the first flow path 11 through the fifth flow f5 is in contact with the dielectric insertion 20. Further, the fourth metal insertion 22d supplies the electrons to the backwardly flowing fifth flow f5 to further accelerate the generation of the plasma.

Figure 13:
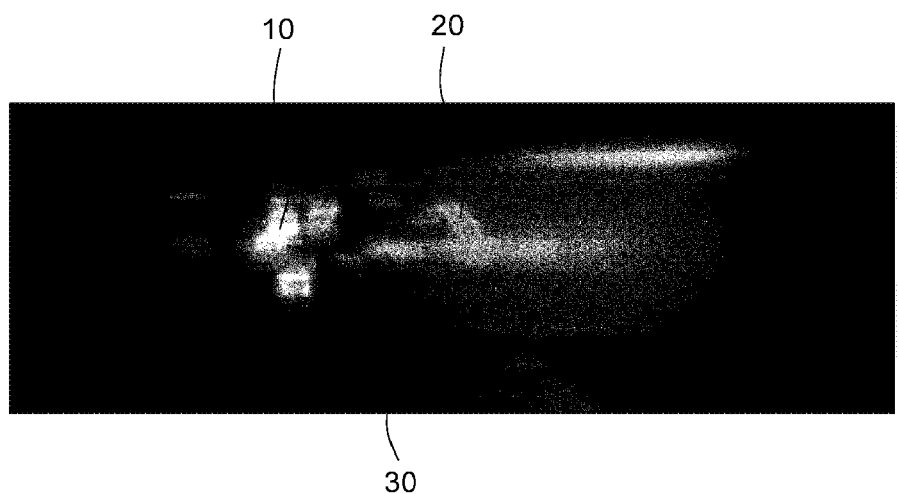
FIG. 13 is an image illustrating that plasma is generated from an underwater plasma generating apparatus according to an embodiment of the present invention.

FIG. 13 is an image illustrating that plasma is generated from an underwater plasma generating apparatus 1 according to an embodiment of the present invention. For reference, FIG. 13 was photographed in a dark room condition to more clearly represent the plasma generated in the reactor 10.

Referring to FIGS. 4 and 13, the plasma is repeatedly generated and extinguished in the reactor 10 along the flow of the working fluid. Further, the plasma may be simultaneously generated in a plurality of positions.

A first plasma P1 is a plasma generated in the working fluid contained in the collection groove 214 of the dielectric insertion 20. As mentioned above, a part of the working fluid ejected from the end portion of the dielectric insertion 20 backwardly flows to the collection groove 214 to be contained in the collection groove 214. The working fluid contained in the collection groove 214 rotates along a circumferential surface of the dielectric insertion 20 in the collection groove 214. During this rotating process, the first plasma P1 may be generated.

The second plasma P2 may be generated when the working fluid in the collection groove 214 is leaked to the end portion of the third part 213. The working fluid in the collection groove 214 joins the flow of the working fluid ejected from the end portion of the third part 213 to strengthen the flow of the working fluid ejected to the end portion of the third part 213. During this process, the second plasma P2 may be generated. In the meantime, the second plasma P2 is an example showing that the working fluid in the collection groove 214 strengthens the flow of the working fluid ejected to the outside of the third part 213 of the dielectric insertion 20.

A third plasma P3 may be generated from the working fluid which is ejected from the through hole of the dielectric insertion 20 to the end portion of the third part 213. The third plasma P3 may be generated from the inside of the through hole. The third plasma P3 may be generated immediately after escaping the dielectric insertion 20. The third plasma P3 may be considered as a main plasma among the plasmas generated in the reactor 10. For example, when a metal probe 40 which is connected to a capacitor and the like is connected to the third plasma P3, the electric energy may be acquired.

As described above, according to the embodiment of the present disclosure, the reactor 10 in which a flow path through which the working fluid can move is formed and a metal catalyst which is accommodated in the flow path to cause the cavitation in one space of the flow path and generates a frictional electricity when the fluid flows are provided therein. Therefore, a large amount of micro-nano bubbles which is formed with a size of 5 μm or less and has a surface potential with a negative charge is generated in a fluid which flows in the reactor 10 and moves in one direction and the same type of charge is applied to the micro-nano bubbles which move together with the fluid to continuously collapse the micro-nano bubbles by the repulsive force, thereby continuously generating a plasma with a high density.

Further, unlike a gas plasma generating apparatus of the related art, without using a high voltage of several thousands to tens of thousands of volts, the plasma may be generated only by the circulation of hydrocarbon oil, hard water ($H_2O$), or the working fluid in which hard water and heavy water ($D_2O$) are mixed. By doing this, a plasma with a higher density than that of the gas plasma may be generated and the structure of the apparatus is simplified to reduce the cost.

Further, the plasma may be continuously generated while circulating the working fluid in one direction and the plasma is generated while being captured in a liquid fluid so that the generation of the plasma by sonoluminescence or chemoluminescence is excluded, to simplify the process and minimize the loss rate of the plasma.

Further, the plasma with a high density is generated in the working fluid which circulates at a rapid speed to ionize the working fluid and a magnetic field is formed in a path where the ionized working fluid moves to efficiently separate ions included in the working fluid in accordance with the electrical polarity.

Further, when hard water ($H_2O$) or the mixture of hard water and heavy water ($D_2O$) is applied as a working fluid, $H^+$ ions and $OH^-$ ions may be separated from the ionized working fluid without causing oscillation relaxation and further, the separated $H^+$ ions are collected to produce a large amount of hydrogen with a high purity.

Further, a plurality of probes which is detachable from the reactor 10 to be partially exposed to an inner space where the plasma is generated is provided so that when the capacitor and the like is connected to the probe, a high voltage electric energy may be acquired.

The exemplary embodiments of the present invention have been illustrated and described above, but the present invention is not limited to the above-described specific embodiment, it is obvious that various modification may be made by those skilled in the art, to which the present invention pertains without departing from the gist of the present invention, which is claimed in the claims, and such modified embodiments should not be individually understood from the technical spirit or prospect of the present invention.

INDUSTRIAL APPLICABILITY

The underwater plasma generating apparatus according to the present embodiment may be used in a power generation system that generates electric energy.

The invention claimed is:

1. An underwater plasma generating apparatus, comprising:
   a reactor inside of which a flow path, through which a working fluid passes, is formed along a length direction; and
   a dielectric insertion which is disposed on the flow path to partition the flow path into a plurality of spaces, has therein one or more through holes for connecting the plurality of spaces and having a smaller cross-sectional width compared to the flow path, and has on one side, a metal catalyst coming into contact with the working fluid which has flowed in through the through holes.

2. The underwater plasma generating apparatus of claim 1, wherein in the working fluid flowing in one space of the reactor, micro-nano bubbles which have a surface potential of a negative charge and have a predetermined size or less are generated by cavitation, the micro-nano bubbles which flow into the through hole together with the working fluid to pass through the metal catalyst collapse by the same kind of charges emitted from the metal catalyst to generate plasma, and the working fluid which moves to the other space of the reactor through the dielectric insertion is exposed to the plasma to be ionized.

3. The underwater plasma generating apparatus of claim 2, further comprising:
   an ion separation unit which is installed on an outer surface of the reactor corresponding to the other space of the reactor and applies a magnetic field to the flow of the working fluid ionized by the plasma to separate ions included in the working fluid in accordance with electrical polarities.

4. The underwater plasma generating apparatus of claim 3, wherein the working fluid is hard water ($H_2O$) having a specific resistance of $10^4$ ω·cm or higher or a mixture of the hard water and heavy water ($D_2O$) and the ion separation unit separates $H^+$ ions and $OH^-$ ions from the working fluid.

5. The underwater plasma generating apparatus of claim 3, wherein the ion separation unit includes:
   a first magnetic substance which is installed on one outer surface of the reactor along a direction perpendicular to an axial direction of the reactor and has an S polarity; and
   a second magnetic substance which is installed on the other outer surface of the reactor to be opposite to the first magnetic substance and has an N polarity.

6. The underwater plasma generating apparatus of claim 5, wherein the ion separation unit further includes:
   a magnetic substance fixing unit which accommodates the first magnetic substance and the second magnetic substance to be fixed and is coupled to an outer surface of the reactor as a module.

7. The underwater plasma generating apparatus of claim 6, wherein the magnetic substance fixing unit includes:
   a housing which has an accommodation space for accommodating the reactor, the first magnetic substance, and the second magnetic substance;
   a diaphragm which is coupled to the inside of the housing to partition the accommodating space into a plurality of spaces and supports the first magnetic substance and the second magnetic substance to restrict the movement of the first magnetic substance and the second magnetic substance to a direction perpendicular to the axial direction of the reactor; and
   a bracket which is fastened with one end portion of the housing along an axial direction of the housing to restrict the movement of the first magnetic substance and the second magnetic substance to the axial direction of the reactor and has a reactor through hole through which the reactor passes.

8. The underwater plasma generating apparatus of claim 3, wherein the flow path includes:
   a first flow path in which the working fluid introduced from the outside is accommodated;
   a second flow path in which the working fluid passing through the dielectric insertion is accommodated; and
   a third flow path which connects the first flow path and the second flow path and has a smaller inner diameter than those of the first flow path and the second flow path,
   a locking protrusion to which the dielectric insertion is caught to be supported along the moving direction of the working fluid is formed between the first flow path and the third flow path, and
   a guide surface is formed between the second flow path and the third flow path to guide the movement of the working fluid which is ejected from the dielectric insertion to flow back to the third flow path.

9. The underwater plasma generating apparatus of claim 8, wherein the guide surface is formed with a structure of a curved surface or an inclined surface.

10. The underwater plasma generating apparatus of claim 8, wherein at the outside of the reactor, a seating support groove which is dented with a predetermined depth from the end portion of the reactor along the length direction of the reactor so that the ion separation unit is seated and restricts the movement of the ion separation unit to dispose the ion separation unit in a position corresponding to the second flow path is formed.

11. The underwater plasma generating apparatus of claim 10, wherein a length of the second flow path is longer than a length obtained by connecting a length of the first flow path and a length of the third flow path.

12. The underwater plasma generating apparatus of claim 8, wherein a ratio of a diameter of the first flow path and a diameter of the through hole is at least one of 10:0.5 and 10:4.

13. The underwater plasma generating apparatus of claim 12, wherein the dielectric insertion includes:
 a dielectric substance which is formed of a dielectric material having a predetermined permittivity and is accommodated over the first flow path, the second flow path, and the third flow path, and
 a metal insertion which is accommodated in the first flow path and is disposed in front of the dielectric substance to be in contact with the dielectric substance through one surface.

14. The underwater plasma generating apparatus of claim 13, wherein the dielectric substance includes:
 a first part which is formed to have a size corresponding to the first flow path to be accommodated in the first flow path and has one surface supported by being caught by the locking protrusion;
 a second part which extends from the first part along an axial direction with a predetermined length to be accommodated in the third flow path and is formed to have a size corresponding to the third flow path; and
 a third part which extends from the second part along an axial direction with a predetermined length to be accommodated in the second flow path and has a diameter which is gradually reduced toward the moving direction of the working fluid.

15. The underwater plasma generating apparatus of claim 5, further comprising:
 a metal probe which is opposite to a direction perpendicular to a direction where the first magnetic substance and the second magnetic substance are disposed to be opposite and passes through the reactor so that a part thereof is accommodated in the other space of the flow path.

16. The underwater plasma generating apparatus of claim 15, wherein in the other space of the flow path, a distance between an end portion of the dielectric insertion and the probe is longer than a distance between the probe and an end portion of the reactor.

* * * * *